(12) United States Patent
McLain et al.

(10) Patent No.: US 9,555,432 B2
(45) Date of Patent: Jan. 31, 2017

(54) WASTE STREAM MANAGEMENT SYSTEM AND METHOD

(71) Applicant: J & L Oilfield Service LLC, Shattuck, OK (US)

(72) Inventors: William F McLain, Woodward, OK (US); Daniel Adam Kelln, Shattuck, OK (US); Brady Cole Bay, Shattuck, OK (US)

(73) Assignee: J & L OIL FIELD SERVICES, L.L.C., Shattuck, OK (US)

( * ) Notice: Subject to any disclaimer, the term of this patent is extended or adjusted under 35 U.S.C. 154(b) by 0 days.

(21) Appl. No.: 15/147,618

(22) Filed: May 5, 2016

(65) Prior Publication Data

US 2016/0243571 A1 Aug. 25, 2016

Related U.S. Application Data

(62) Division of application No. 13/912,621, filed on Jun. 7, 2013, now Pat. No. 9,333,520.

(51) Int. Cl.

| | |
|---|---|
| *B05B 12/12* | (2006.01) |
| *E03F 7/10* | (2006.01) |
| *A01B 79/00* | (2006.01) |
| *A01C 23/00* | (2006.01) |
| *G01V 9/00* | (2006.01) |

(52) U.S. Cl.
CPC ............ *B05B 12/12* (2013.01); *A01B 79/005* (2013.01); *A01C 23/007* (2013.01); *E03F 7/10* (2013.01); *E03F 7/106* (2013.01); *G01V 9/00* (2013.01)

(58) Field of Classification Search
None
See application file for complete search history.

(56) References Cited

U.S. PATENT DOCUMENTS

| | | | | |
|---|---|---|---|---|
| 2,795,542 A | * | 6/1957 | Horne | ..................... C02F 3/046 |
| | | | | 210/170.08 |
| 3,260,464 A | * | 7/1966 | Harant | ................. A01C 23/042 |
| | | | | 239/310 |

(Continued)

OTHER PUBLICATIONS

PCT Search Report for application PCT/CA2010/001884, dated Mar. 1, 2011.

(Continued)

*Primary Examiner* — Shelley Chen
(74) *Attorney, Agent, or Firm* — Dunlap Codding, P.C.

(57) ABSTRACT

A contaminant management system includes a scouting unit configured to map a perimeter including a portion of a land area where to apply a waste stream, and to transmit the perimeter to a control center configured to access data indicative of a contaminant profile of a contaminant in the portion of the land area in the perimeter, and data of a maximum allowable amount of the contaminant, and to generate a contaminant capacity profile for the portion of the land area in the perimeter. An applicator unit includes a movable container, a variable flowrate valve and a controller configured to receive the contaminant capacity profile and data indicative of a concentration of the contaminant in a volume of fluids loaded in the applicator unit, and to cause the variable flowrate valve to open, close, or maintain its position based on the location of the applicator unit relative to the perimeter.

10 Claims, 15 Drawing Sheets

(56) References Cited

U.S. PATENT DOCUMENTS

| | | | | |
|---|---|---|---|---|
| 3,361,357 | A * | 1/1968 | Johnston | A01M 7/0089 239/127 |
| 3,782,634 | A | 1/1974 | Herman | |
| 3,877,645 | A | 4/1975 | Oligschlaeger | |
| 4,315,317 | A | 2/1982 | Orchard | |
| 5,271,694 | A * | 12/1993 | Cooper | B09C 1/02 405/128.7 |
| 5,355,815 | A * | 10/1994 | Monson | A01B 79/005 111/127 |
| 5,475,614 | A | 12/1995 | Tofte | |
| 5,528,949 | A | 6/1996 | Stainton | |
| 5,653,389 | A | 8/1997 | Henderson | |
| 5,913,915 | A * | 6/1999 | McQuinn | A01B 79/005 700/231 |
| 5,931,882 | A * | 8/1999 | Fick | A01B 79/005 111/903 |
| 5,950,921 | A * | 9/1999 | Cain | A01M 7/0089 239/1 |
| 5,971,294 | A * | 10/1999 | Thompson | B05B 12/04 239/163 |
| 6,070,539 | A * | 6/2000 | Flamme | A01B 79/005 111/177 |
| 6,122,581 | A * | 9/2000 | McQuinn | A01B 79/005 701/468 |
| 8,720,803 | B1 * | 5/2014 | Standley | B05B 3/18 239/407 |
| 8,734,619 | B1 * | 5/2014 | Corson | C23C 14/0057 204/192.13 |
| 2003/0155309 | A1 * | 8/2003 | Schindler | B09C 1/002 210/747.8 |
| 2003/0173784 | A1 * | 9/2003 | Jones | B01F 3/0865 290/54 |
| 2004/0124260 | A1 | 7/2004 | Ward | |
| 2006/0260806 | A1 * | 11/2006 | Moriarty | E21B 47/182 166/250.1 |
| 2010/0301134 | A1 | 12/2010 | Anderton | |
| 2011/0266357 | A1 * | 11/2011 | Orcutt | A01C 23/001 239/1 |
| 2011/0270495 | A1 | 11/2011 | Knapp | |
| 2012/0222994 | A1 * | 9/2012 | Smaidris | C02F 1/008 210/97 |
| 2013/0019671 | A1 * | 1/2013 | Stibbe | E21B 49/10 73/152.24 |
| 2013/0199340 | A1 * | 8/2013 | Tan | C22B 3/04 75/712 |
| 2013/0291999 | A1 * | 11/2013 | Orcutt | B67D 7/145 141/1 |

OTHER PUBLICATIONS

USPTO Notice of Allowance and Fee(s) Due for U.S. Appl. No. 12/958,294, dated Apr. 27, 2015.

* cited by examiner

WASTE STREAM MANAGEMENT SYSTEM AND METHOD

INCORPORATION BY REFERENCE

The present patent application claims priority to and is a divisional of the patent application identified by U.S. Ser. No. 13/912,621, filed Jun. 7, 2013, the entire contents of both of which are hereby incorporated herein by reference.

BACKGROUND

The inventive concepts disclosed herein are generally directed to waste stream management systems. More particularly, but not by way of limitation, the inventive concepts disclosed herein are directed to a waste stream management system for controlled land application of contaminants from waste stream fluids.

Multiple human activities produce waste streams which include various contaminants at varying concentrations, and which are managed in various manners. For example, municipalities produce waste streams (e.g., sewage), that include fluids which are typically processed and/or treated before being returned to the environment. Further, industrial and agricultural operations generate varying contaminant concentration waste streams that likewise are processed or treated to minimize the environmental effects of the contaminants contained therein. For example, waste streams from paper mills, industrial facilities, poultry processing plants, slaughter houses, and other industrial, agricultural, or municipal sources include contaminants at varying concentrations, and the particular contaminants present in a waste stream and their respective concentrations generally guide the appropriate method of management of the waste stream.

The oil and gas industry produces multiple waste streams at various stages of oil and gas well development and exploitation, which include water-based fluids and/or solids such as drilling mud and flowback water, oil-based fluids and solids, and other similar waste streams, which are disposed of in compliance with a variety of environmental regulations. For example, prior art oilfield waste stream management practice has been to deposit used drilling mud into a mud pit at the well site, where the drilling mud is simply encased in a layer of dirt after the well is completed. The encased drilling mud remains at that location indefinitely, increasing the potential for contamination of adjacent soils, and surface and subsurface waters.

In recent years, due to increasing environmental concerns and strict legislative regulation and oversight, conventional industrial, municipal, and agricultural waste stream management practices have faced increased scrutiny, and multiple improvements and changes to such practices have been proposed and/or mandated to protect the environment.

One such proposed waste stream management practice has been to apply waste streams on a tract of land to spread the contaminant(s) present in the waste stream over a land area such that the concentration of contaminants per area of land is well below safe levels for each contaminant as set by applicable laws or regulations. In some instances, the land application of waste streams not only does not harm the land area or soil onto which the waste stream has been applied, but actually improves the usability of the tract of land as agricultural land.

Several systems have been recently proposed to apply waste streams to land. For example, the system described in U.S. Publication No. 2011/0266357, the entire disclosure of which is hereby expressly incorporated herein by reference, uses a constant flowrate on/off 4-inch valve, which is opened when an applicator vehicle is moving above a predetermined minimum speed, so that a rate of application when the valve is opened and when the applicator vehicle is moving above the predetermined minimum speed does not exceed a predetermined maximum application rate.

However, applying waste streams at a constant flowrate is generally suboptimal, as such application may result in applying a lower level of contaminants than allowed by applicable regulations by not fully utilizing the available area of land, thus leaving a substantial unused contaminant loading capacity in the land area. Further, in some instances where the predetermined minimum speed cannot be achieved or maintained by the applicator vehicle (e.g., when the applicator vehicle moves up or down a hill, and/or over slippery or rough terrain) the application is discontinued for any periods of time when the applicator vehicle is moving below the predetermined minimum speed. This results in significant loss of time for the operator of the applicator unit. Simply driving the applicator vehicle over the land area without applying waste stream fluids unnecessarily increases the land area needed to manage a given volume of waste stream fluids and the overall waste stream application times, and results in increased fuel and other costs. Finally, requiring the applicator vehicle to move at or above a predetermined minimum speed over rough terrain increases applicator vehicle maintenance costs and downtime.

Further, applying waste streams at constant flowrates limits the usability of the applicator vehicle where the concentrations of contaminants vary over time or per each load of waste stream fluids, such as when a live waste stream has to be managed which is often the case in oil and gas operations. For example, when the level of contaminants in a particular load of waste stream fluids from a live waste stream is higher than expected, applying at a constant rate may not be feasible, as the applicator vehicle may be unable to achieve a high enough speed to apply the waste stream at an acceptable application rate. Further, when the level of contaminants in a particular load of waste stream fluids from a live waste stream is lower than expected, applying at a constant rate at the predetermined minimum speed would leave a significant contaminant capacity in the land area and significantly underutilize the available land area. Managing a waste stream with variable contaminant concentrations with constant flowrate application systems may result in inaccurate measurement of the actual amount of contaminant applied to the land area, which would make repeated applications on the same land area extremely risky and/or practically impossible.

SUMMARY

In one aspect, the inventive concepts disclosed herein are directed to an applicator unit for applying waste stream fluids containing a contaminant to a land area. The applicator unit may include a movable container configured to hold a volume of waste stream fluids including a contaminant, and a diffuser. A valve assembly may include a conduit fluidly coupled with the movable container and configured to direct a volume of fluids to the diffuser, a variable flowrate valve operably coupled with the conduit, and an actuator operably coupled with the variable flowrate valve and configured to selectively and incrementally open and close the variable flowrate valve in response to receiving at least one control signal. A controller may include a location signal receiver configured to receive a signal indicative of a geospatial location of the of the movable container relative to a land area, a non-transitory computer readable medium storing processor executable code and a contaminant capacity profile of the land area indicative of an amount of the contaminant to be applied to the land area, and a processor operably coupled with the location signal receiver and with the non-transitory computer readable medium storing processor executable code, wherein the processor executable code, when executed by the processor, causes the processor to control the actuator to set the variable flowrate valve at a predetermined position based at least partially on the geospatial location of the movable container and the contaminant capacity profile.

The contaminant capacity profile may include an exclusion zone in the land area where no waste stream fluids are to be applied, and the processor may transmit a control signal to the actuator directing the actuator to close the variable flowrate valve so as to prevent waste stream fluids from being applied in the exclusion zone.

The valve assembly may also include a flowmeter operably coupled with the conduit upstream of the variable flowrate valve. The flowmeter may be operably coupled with the controller and may be configured to detect a volume of waste stream fluids flowing through the flowmeter, and to output a signal indicative of the volume of waste stream fluids flowing through the flowmeter. The processor executable code may further cause the processor to receive the signal and to update the contaminant capacity profile of the land area based on the volume of waste stream fluids applied to the land area.

The valve assembly may also include a flowmeter operably coupled with the conduit upstream of the variable flowrate valve, and operably coupled with the controller. The flowmeter may be configured to detect a volume of waste stream fluids flowing through the flowmeter, and to output a first signal indicative of the volume of waste stream fluids flowing through the flowmeter. A first control module may be operably coupled with the flowmeter, the actuator, and the controller, and may be configured to receive the first signal, quantify the volume of fluids flowing through the flowmeter, and to transmit a second signal indicative of the volume of waste stream fluids flowing through the flowmeter to the controller. A second control module may be operably coupled with the flowmeter, the actuator, and the controller, and may be configured to receive the first signal, quantify an amount of the contaminant flowing through the flowmeter, and transmit a third signal indicative of the amount of the contaminant flowing through the flowmeter. The processor executable code may further cause the processor to receive the second and third signals and to update the contaminant capacity profile of the land area based on the volume of waste stream fluids applied to the land area and/or the amount of the contaminant applied to the land area.

The fluid conduit may include a substantially straight portion positioned upstream of the flowmeter and configured so that fluids flowing through the substantially straight portion of the conduit enter the flowmeter in a substantially laminar fashion. The flowmeter may be a magnetically induced flow meter.

The amount of the contaminant applied to the land area may be expressed as weight of the contaminant per area, and/or the amount of waste stream fluids may be expressed in volume per area.

The processor may transmit a control signal to the actuator by: (a) transmitting a volume control signal to the first control module indicative of a total volume of waste stream fluids to be applied to the land area, and (b) transmitting a contaminant amount control signal to the second control module indicative of a total amount of the contaminant to be applied to the land area. The first control module may transmit a first control signal to the actuator and the second control module may transmit a second control signal to the actuator directing the actuator to incrementally open, close, or maintain a current position of the variable flowrate valve.

The controller may also include a wireless transceiver, and the processor executable code may further cause the processor to receive a wireless signal indicative of an amount of the contaminant applied to the land area by a second applicator unit and a geospatial location of the applied amount of the contaminant in the land area, and to update the contaminant capacity profile of the land area based on the amount of the contaminant applied to the land area by the second applicator unit. The processor executable code may further cause the processor to transmit a wireless signal indicative of the total amount of the contaminant applied to the land area via the wireless transceiver.

In another aspect, the inventive concepts disclosed herein are directed to a control center for a contaminant management system, including a computer system having a processor and a non-transitory computer readable medium storing processor executable code, which when executed by the processor, causes the processor to: (a) receive via a computer port a first signal from a computer network indicative of a land area to which a volume of waste stream fluids containing a contaminant is to be applied; (b) access data indicative of a contaminant profile of the contaminant in the land area; (c) access data indicative of a maximum allowable amount of the contaminant in the land area; and (d) generate a contaminant capacity profile of the land area indicative of an amount of the contaminant to be applied to at least a portion of the land area based at least in part on the contaminant profile and the maximum allowable amount of the contaminant in the land area.

The processor executable code may further cause the processor to transmit a signal indicative of the contaminant capacity profile to a remote applicator unit over the computer network.

The processor executable code may further causes the processor to: (e) receive a fourth signal over the computer network, the fourth signal indicative of an amount of the contaminant applied to the land area by a remote applicator unit; and (f) update the contaminant capacity profile of the contaminant in the land area based on an amount of contaminant applied to the land area.

The processor executable code may further cause the processor to store the updated contaminant capacity profile of the contaminant in the land area in a non-transitory computer readable medium.

In a further aspect, the inventive concepts disclosed herein are directed to a scouting unit for a waste stream management system. The scouting unit may include a location signal receiver configured to receive a signal indicative of a geospatial location of the location signal receiver relative to a land area, and a processor operably coupled with a non-transitory computer medium storing processor executable code, which when executed by the processor causes the processor to: (a) map one or more georeferenced points indicative of a perimeter including a portion of the land area on which a volume of fluids including a concentration of a contaminant is to be applied; (b) determine at least one soil sampling location for an existing level of the contaminant in the portion of the land area in the perimeter; and (c) map one or more georeferenced points indicative of at least one exclusion zone where the volume of fluids including the contaminant is not to be applied.

The scouting unit may also include an input device, and the processor executable code, when executed by the processor, may cause the processor to receive input from a user, indicative of one or more user-designated georeferenced points indicative of a user-designated exclusion zone at least partially in the perimeter where no volume of fluids is to be applied, and exclude the user-designated exclusion zone from the perimeter.

The scouting unit may also have a transceiver operably coupled with a computer network, and the processor executable code, when executed by the processor, may cause the processor to transmit a signal over the computer network indicative of the one or more georeferenced points indicative of the perimeter of the land area and/or a signal over the computer network indicative of the one or more georeferenced points indicative of the at least one exclusion zone.

In yet another aspect, the inventive concepts disclosed herein are directed to a contaminant management system. The system may include a scouting unit including a signal receiver configured to receive a signal indicative of a geospatial location of the scouting unit relative to a land area, at least one processor, and a non-transitory computer readable medium storing processor executable code, which when executed by the processor, causes the processor to map one or more georeferenced points indicative of a perimeter including a portion of the land area where a volume of fluids including a concentration of a contaminant is to be applied, and to transmit a first signal over a computer network indicative of the one or more georeferenced points indicative of the perimeter. The system may also include a control center including a processor and a non-transitory computer readable medium storing processor executable code, which when executed by the processor, causes the processor to: (a) receive the first signal via a computer port coupled with the computer network; (b) access data indicative of a contaminant profile of the at least one contaminant in the portion of the land area in the perimeter; (c) access data indicative of a maximum allowable amount of the contaminant in the portion of the land area in the perimeter; and (d) generate a contaminant capacity profile for the portion of the land area in the perimeter based at least in part on the contaminant profile of the contaminant in the portion of the land area in the perimeter and the maximum allowable amount of the contaminant in the portion of the land area in the perimeter.

The system may also have an applicator unit including a movable container, a valve assembly including a variable flowrate valve and an actuator operably coupled with the variable flowrate valve and configured to incrementally open, close, or maintain a position of the variable flowrate valve, and a controller operably coupled with the actuator. The controller may include a location signal receiver configured to receive a signal indicative of a geospatial location of the applicator relative to the land area, a processor, and a non-transitory computer readable medium coupled with the at least one processor and storing processor executable code which when executed by the processor, causes the processor to access the contaminant capacity profile, access data indicative of a concentration of the at least one contaminant in a volume of fluids loaded in the movable container; and provide a control signal to the actuator to cause the actuator to incrementally open or close, or maintain the position of the variable flowrate valve based at least partially on the geospatial location of the applicator relative to the land area.

The contaminant capacity profile may include at least one exclusion zone where no waste stream fluids are to be applied, and the controller may cause the actuator to close the variable flowrate valve in response to the movable container being in the at least one exclusion zone.

In a further aspect, the inventive concepts disclosed herein are directed to a method for managing a live stream of waste stream fluids. The method may include: (a) loading a first volume of waste stream fluids including a first concentration of a contaminant in a first applicator unit configured to apply waste stream fluids to a land area; (b) accessing, by a controller of the applicator unit, data indicative of the first concentration of a contaminant in the volume of waste stream fluids loaded in the first applicator unit; (c) accessing, by the controller of the applicator unit, a contaminant capacity profile indicative of an amount of the contaminant to be applied in the land area; (d) applying at least a portion of the volume of waste stream fluids loaded in the application unit on at least a portion of the land area based on the first concentration of the contaminant in the volume of waste stream fluids and the contaminant capacity profile; and (e) generating, by the controller of the applicator unit, an updated contaminant capacity profile based at least in part on the volume of waste stream fluids applied on the land area and the first concentration of the contaminant in the volume of waste stream fluids applied to the land area.

The method may also include: (f) loading a second volume of waste stream fluids including a second concentration of the contaminant onto a second applicator unit; (g) accessing, by a controller of the second applicator unit, data indicative of the second concentration of the contaminant in the volume of waste stream fluids loaded in the second applicator unit; (h) accessing, by the controller of the second applicator unit, data indicative of the updated contaminant capacity profile from the first applicator unit; and (i) applying at least a portion of the volume of waste stream fluids loaded in the second applicator unit on at least a portion of the land area, based on the second concentration of the contaminant in the volume of waste stream fluids and the updated contaminant capacity profile. The second concentration and the first concentration are different from one another. The data indicative of the second concentration of the at least one contaminant in the volume of waste stream fluids loaded in the first applicator unit may be obtained by field-testing the concentration of the at least one contaminant in the volume of waste stream fluids loaded in the first applicator unit.

In yet another aspect, the inventive concepts disclosed herein are directed to an applicator unit for applying waste stream fluids containing at least one contaminant to a land area. The applicator unit may include a movable container configured to hold a volume of waste stream fluids including at least one contaminant, a diffuser, a valve assembly including a conduit fluidly coupled with the movable container and configured to direct a volume of fluids to the diffuser, a variable flowrate valve operably coupled with the conduit, and an actuator operably coupled with the variable flowrate valve and configured to selectively and incrementally open and close the variable flowrate valve in response to receiving at least one control signal. A soil analyzer may be associated with the movable container and may be configured to measure a level of the at least one contaminant in a land upstream of the diffuser, and to output a signal indicative of the level of the at least one contaminant in the land area. A controller may include a non-transitory computer readable medium storing processor executable code and data indicative of a maximum allowable amount of the at least one contaminant in the land area, and at least one processor operably coupled with the non-transitory computer readable medium storing processor executable code, wherein the processor executable code, when executed by the at least one processor, causes the at least one processor to receive the signal indicative of the level of the at least one contaminant in the land area and control the actuator to set the variable flowrate valve at a predetermined position based at least partially on the maximum allowable amount of the at least one contaminant in the land area and the level of the at least one contaminant in the land area measured by the soil analyzer.

BRIEF DESCRIPTION OF THE DRAWINGS

The accompanying drawings, which are incorporated in and constitute a part of this specification, illustrate one or more implementations described herein and, together with the description, explain these implementations. Like reference numerals in the figures represent and refer to the same element or function. In the drawings.

DETAILED DESCRIPTION OF EXEMPLARY EMBODIMENTS

Figure 1:
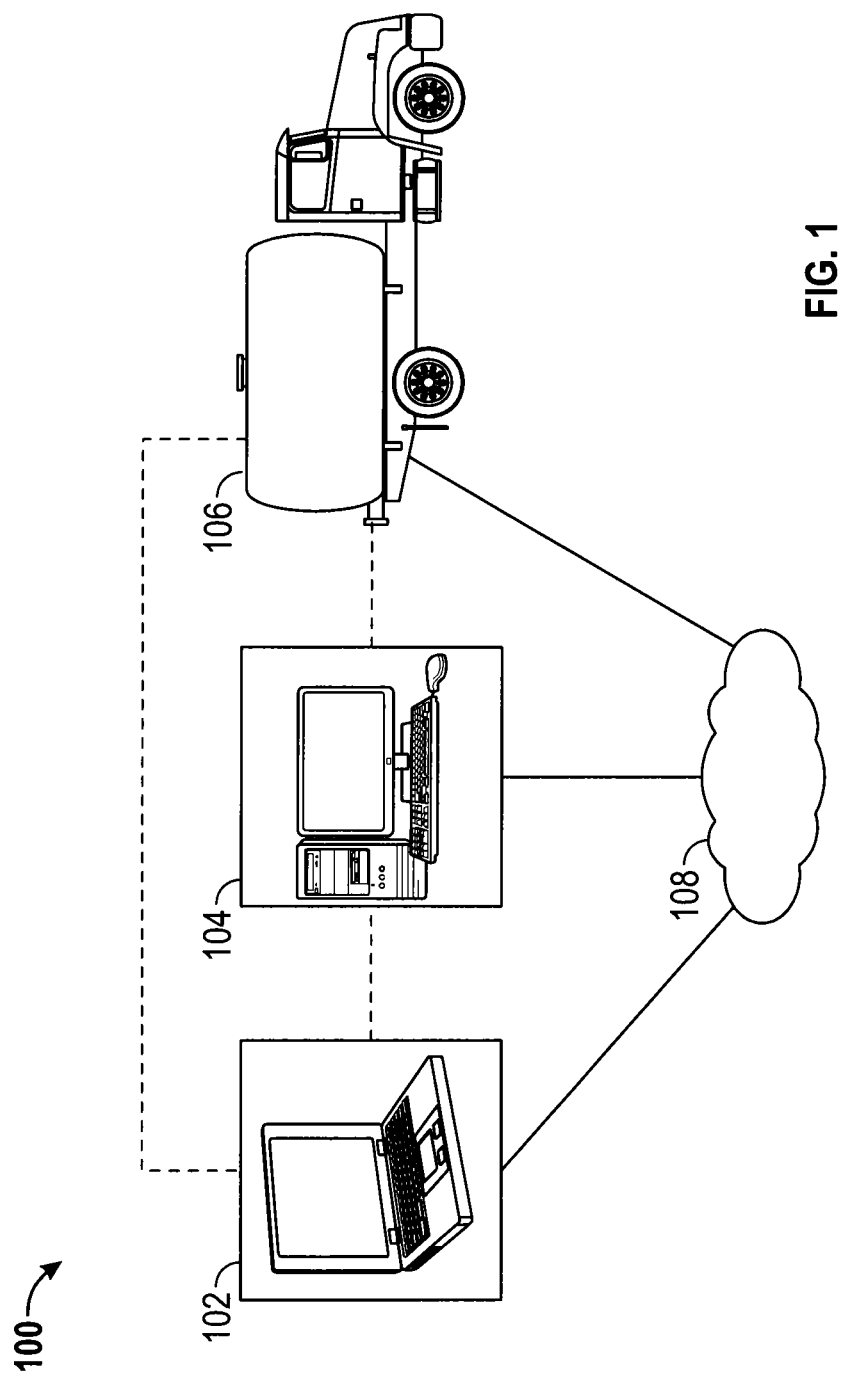
FIG. 1 is a general overview of an exemplary embodiment of a waste stream management system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the terms "waste stream" and "waste stream fluid(s)" are intended to include a waste stream produced by an agricultural, municipal, industrial, or other process or source including at least one contaminant, and includes fluids (e.g., gasses and vapors) and solids (e.g., sediment, soil, sand, clay, solid chemicals, compost, and other solids, which may be dissolved, dispersed, suspended, or otherwise mixed with fluids.

As used herein the term "contaminant" is intended to include any pollutant, impurity, toxin, constituent, compound, ion, molecule, salt, poisonous substance, or chemical, which is toxic or otherwise detrimental to a living organism (e.g., plants, animals, microorganisms, humans) within a waste stream, and for which a maximum allowable level, concentration, or amount, within soil, land area, or water, may be established by an agreement (e.g., with a landowner), or by a governmental or municipal body or agency.

As used herein the term "profile" is intended to include a summary or analysis of data representing distinctive features or characteristics. The profiles described herein can be a geographic information system (GIS) layer applied to a section of a map.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The inventive concepts disclosed herein will be described in detail in connection with managing an oilfield waste stream including drilling mud by controlled application of waste stream fluids to a land area, the instant inventive concepts may be applied to waste stream management by land application of any desired waste stream fluids including one or more contaminants. For example, waste stream fluids including municipal sewage, animal manure, industrial waste streams, agricultural waste streams, or combinations thereof, may be applied to any suitable land area using a system and method according to the inventive concepts disclosed herein.

A waste stream management system according to exemplary embodiments of the inventive concepts disclosed herein may include a scouting unit, a control center, and an applicator unit, which may cooperate with one another to determine a contaminant profile of a land area, calculate a contaminant capacity profile of one or more separate regions within a land area (e.g., within a predetermined perimeter), determine a contaminant concentration and/or content in a volume of waste stream fluids to be applied to an individual region of the separate regions of the land area, and apply a volume of the waste stream fluids to the region of the land area based at least in part on the contaminant capacity profile of the land area and the contaminant concentration and/or in the volume of waste stream fluids to be applied to the land area.

Exemplary embodiments of the inventive concepts disclosed herein provide a waste stream management system and method, which take into account land area specific contaminant sampling and/or other information (e.g., gathered via a scouting unit), land area specific contaminant capacity profile (e.g., developed by a control center), and a waste stream fluids characterization process (e.g., carried out by a lab and/or by an applicator unit), to control the application of waste stream fluids to the land area designed to be within preset maximum contaminant levels in the land area.

Land area-specific criteria may be derived from land area investigation by a user of a scouting unit, and may be used to design buffer zones, to make ecosystem determinations (e.g., where the ecosystem contaminant limit is lower than the regulatory contaminant limit), identify environmentally or hydrologically sensitive areas (exclusion zones), determine sampling locations to measure preexisting amounts of contaminant in the soil and/or the land area (e.g., by soil sampling) to derive a contaminant profile for the land area, and map one or more georeferenced points indicative of a perimeter defining and/or including an acceptable waste stream fluid application portion or zone of the land area and/or at least one exclusion zone. This information may be transmitted to a control center (e.g., a computer system equipped with environmental guidance software) for development of a contaminant capacity profile for the portion of the land area in the perimeter that governs waste stream fluids application, by managing a most limiting contaminant, and exclusion zones in the land area where no waste stream fluids are to be applied. The contaminant capacity profile may be determined by designating at least one contaminant within the waste stream fluids as the limiting contaminant in accordance with a regulatory standard, a landowner/tenant agreed-upon standard, a customer standard, or an ecosystem standard, or combinations thereof, for example.

The contaminant capacity profile may be transmitted or otherwise provided to an applicator unit, which may operate based at least partially of the contaminant capacity profile, and may not exceed the parameters set by the contaminant capacity profile (e.g., may not apply waste stream fluids outside the portion of the land area in the perimeter and/or into exclusion zones, and may not apply an amount of contaminant exceeding the amount set by the contaminant capacity profile).

In some cases, the applicator unit may be supplied with waste stream fluids characteristics for each load of waste stream fluids it is loaded or otherwise provided with, including the concentration (e.g., density per volume) or amount of at least one contaminant present in the load of waste stream fluids from appropriate lab or field testing (e.g., per batch of waste stream fluids and/or by field testing each load of waste stream fluids in the applicator unit to determine the amount of contaminant present therein). A controller of the applicator unit may use this information to determine a set of current application rules, including correct application rates for each load of waste stream fluids provided to the applicator unit. Each applicator unit may log or record the total volume of waste stream fluids applied (e.g., substantially in real time), the total amount of contaminant applied, and the geospatial location where the waste stream fluids were applied, and may provide application oversight to prevent or substantially eliminate noncompliance-related events.

A log profile or record of the applied amount of contaminant may be provided (e.g., transmitted over a computer network) to the control center (e.g., in real time as the application takes place) and/or to one or more other applicator units in the field, which allows for contaminant profile capacity updates to occur substantially in real time as waste stream fluids and/or contaminant are applied to a land area. The resulting contaminant/soil mixture can be recreated in an updated contaminant profile and/or an updated contaminant capacity profile for the land area to allow for compliance reporting and, in some cases, for one or more other (secondary) application if any portions of the land area have remaining contaminant capacity.

Referring now to the drawings, and to FIG. 1 in particular, shown therein is an exemplary embodiment of a waste stream management system 100 according to the inventive concepts disclosed herein, which may include at least one scouting unit 102, a control center 104, and at least one applicator unit 106, configured to communicate data to one another over a network 108. As will be appreciated by persons of ordinary skill in the art, in some exemplary embodiments the scouting unit 102 and/or the control center 104 may be omitted, and their respective functions may be implemented by an applicator unit 106 having the functionality according to the inventive concepts disclosed herein.

The network 108 may be implemented as any desired computer network permitting bi-directional communication and/or exchange of signals and/or data between the at least one scouting unit 102, the control center 104, and the at least one applicator unit 106, such as the Internet, a cellular network, an optical network, a satellite network, a wireless network, a 3G network, a 4G network, a local area network, an intranet network, a virtual private network, and combinations thereof, and may utilize any desired networking protocol, such as TCP/IP, for example.

Figure 2:
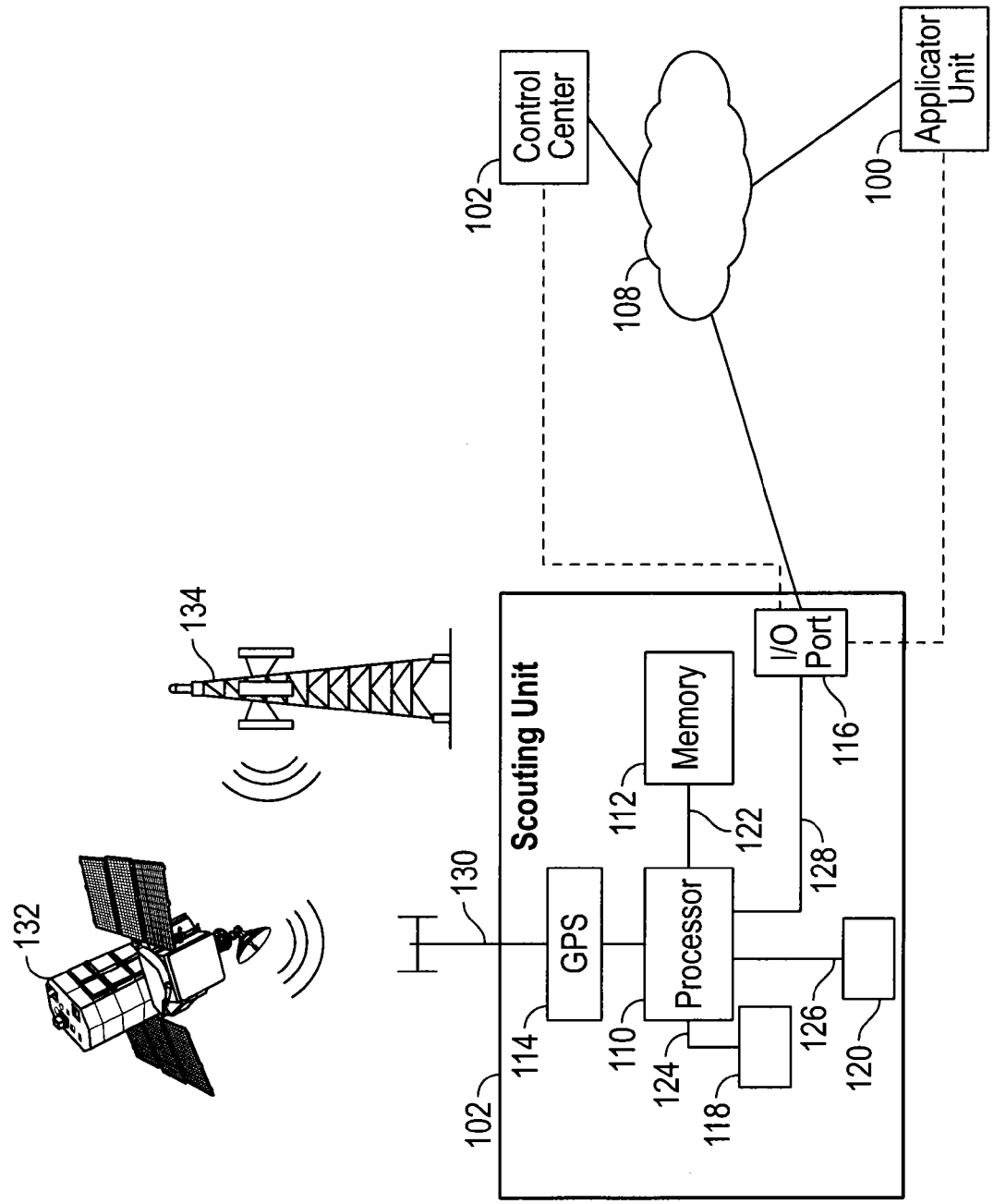
FIG. 2 is a diagram of a scouting unit of the waste stream management system of FIG. 1.

Referring now to FIG. 2, the scouting unit 102 may include at least one processor 110 operably coupled with a non-transitory memory 112 storing processor executable code, a location signal receiver 114, at least one I/O port 116, an input device 118, and an output device 120. The processor 110 may be configured to communicate with the control center 104 and/or with the applicator unit 106 by exchanging one or more signals (e.g., wired, wireless, electrical, or optical) with the control center 104 and/or with the applicator unit 106 via the I/O port 116 and the network 108, for example. In some exemplary embodiments, the scouting unit 102 may be configured to dock or otherwise interface with the applicator unit 106 and/or with the control center 104, such as via a designated dock (not shown), wirelessly, and/or via a wire of a cable, as will be appreciated by persons of ordinary skill in the art having the benefit of the instant disclosure. The scouting unit 102 can be implemented as any desired portable device, such as a personal computer, a smartphone, a laptop, a netbook, a tablet, an e-book reader, a network-capable handheld device, a digital video recorder, a rugged outdoor computing device, and combinations thereof, for example.

The processor 110 may be implemented as a single processor or multiple processors working together to execute the logic and/or processor executable code described herein. Exemplary embodiments of the processor 110 include a digital signal processor (DSP), a central processing unit (CPU), a field programmable gate array (FPGA), a microprocessor, a multi-core processor, and combinations thereof. The processor 110 is capable of communicating with the memory 112 via a path 122 which can be implemented as a data bus, for example. The processor 110 is capable of communicating with the input device 118 and the output device 120 via paths 124 and 126 including one or more data busses, for example. The processor 110 may communicate with the I/O port 116 via a path 128, which may be a data bus. It is to be understood that in certain embodiments using more than one processor 110, the one or more processors 110 may be located remotely from one another, located in the same location, or comprising a unitary multi-core processor 110 (not shown). The processor 110 is capable of reading and/or executing processor executable code and/or of creating, manipulating, altering, and storing data structures into the memory 112.

The memory 112 stores data and processor executable code in the form of software and/or firmware, which includes processor executable code written in any suitable programming language, such as C++. The memory 112 may be implemented as any non-transitory computer-readable medium, such as random access memory (RAM), a CD-ROM, a hard drive, a solid state drive, a flash drive, a memory card, a DVD-ROM, a floppy disk, an optical drive, and combinations thereof, for example. While the memory 112 can be located in the same physical location as the scouting unit 102, the memory 112 may be located remotely from the scouting unit 102 and may communicate with the processor 110 via the I/O port 116 and/or the network 108. Additionally, when more than one memory 112 is used, one or more memory 112 may be located in the same physical location as the scouting unit 102, and one or more memory 112 may be located in a remote physical location from the scouting unit 102. The physical location of the memory 112 can be varied, and the memory 112 may be implemented as a "cloud memory" e.g., a memory 112 which is partially, or completely based on or accessed using the network 108.

The location signal receiver 114 may include an antenna 130, and may be configured to receive a geospatial location signal indicative of the geospatial location, elevation, coordinates, pitch, yaw, tilt, and/or speed of the scouting unit 102 (e.g., from multiple global positioning satellite 132 and/or from multiple cellular phone towers 134), and/or from any other desired geospatial location signal source such as from any suitable global navigation, geospatial location, or positioning system, such as GPS, LORAN, GNSS, a cellular network tower, or any other desired source indicative of a geospatial location or position of the location signal receiver 114, including latitude, longitude, and elevation, for example. In some exemplary embodiments, the location signal receiver 114 may be able to determine its geospatial location on the Earth with sub meter accuracy (e.g., accuracy to less than 1 meter).

The I/O port 116 may be implemented as a physical and/or virtual computer port (e.g., an electrical or optical port), and may be configured to provide an interface between the processor 110 and the network 108 so that the processor 110 may transmit one or more signals indicative of information to the network 108, and so that the processor 110 may receive one or more signals indicative of information from the network 108, for example. In some embodiments, the I/O port 116 may include a wireless modem, a satellite signal receiver, a cellular modem, a USB-port, and combinations thereof, for example.

The input device 118 may be implemented as a keyboard, a mouse, a touchscreen, a stylus, a trackball, a joystick, a digital camera, a microphone, a barcode reader, a video camera, an RFID tag reader, a Bluetooth transceiver or hub, a radio tag reader, a near field communication device, a hardware input port, a docking port, a USB port, and combinations thereon, and is configured to receive an input from a user and to transmit a signal indicative of the received input to the processor 110, for example.

The output device 120 may be implemented as a screen, a monitor, a touch screen, a heads-up display, a speaker, headphones, earpiece, a haptic feedback device, a USB port, an output port, a docking port, and combinations thereof, and may be configured to receive information from the processor 110 and to present such information in any user-perceivable format.

Figure 3:
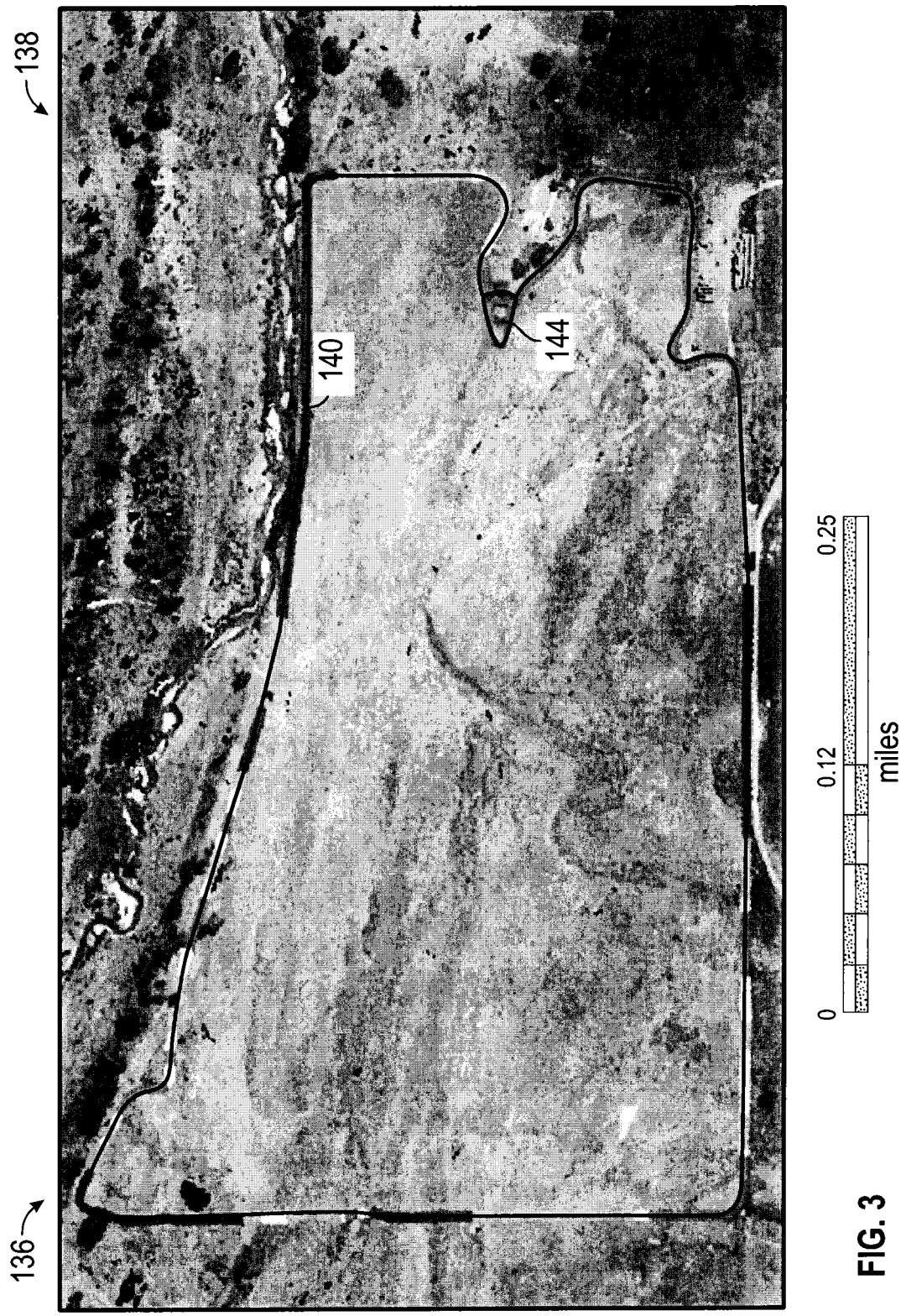
FIG. 3 is a diagram of an exemplary embodiment of a perimeter and an exclusion zone mapped in a land area by the scouting unit according to the inventive concepts disclosed herein.
Figure 4:
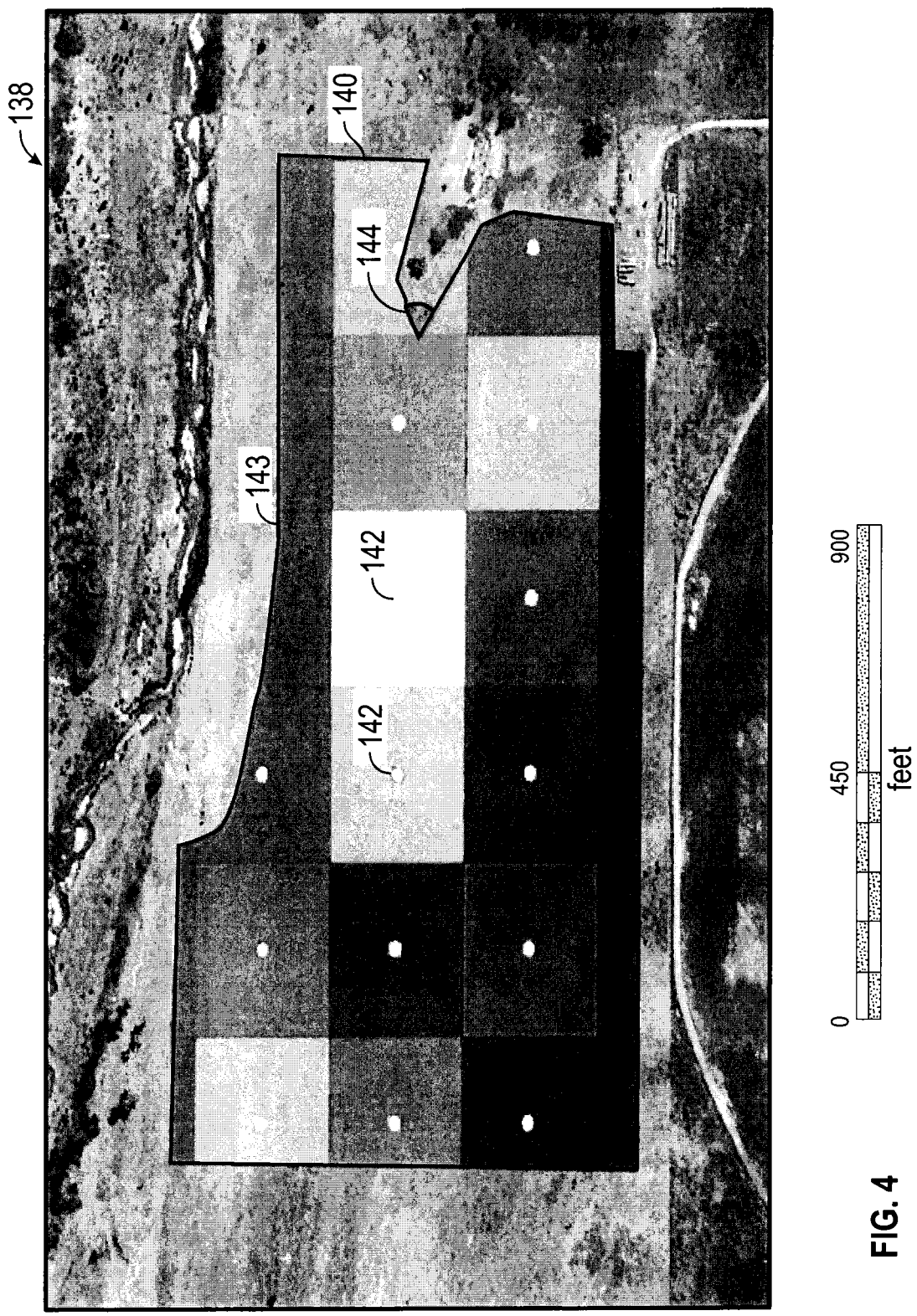
FIG. 4 is a diagram of an exemplary embodiment of a soil sampling grid for the land area of FIG. 3 generated by the scouting unit according to the inventive concepts disclosed herein.

Referring now to FIGS. 3-4, the memory 112 may store processor executable code, which when executed by the processor 110 may cause the processor 110 to generate a map 136 by surveying a land area 138 where a volume of waste stream fluids is to be applied, by mapping one or more georeferenced points indicative of a perimeter 140 including at least a portion or a zone of the land area 138 to which a volume of waste stream fluids is to be applied, designating one or more georeferenced points indicative of at least one soil sampling location 142 and/or a soil sampling grid 143 (FIG. 4) within the perimeter 140 or outside the perimeter 140, where a soil sample indicative of a contaminant profile of at least one contaminant in the land area 138 is to be obtained, and mapping one or more georeferenced points indicative of at least one exclusion zone 144 (in the perimeter 140, outside the perimeter 140, and/or at least partially in the perimeter 140) where waste stream fluids may not be applied.

In some embodiments, the one or more georeferenced points indicative of the perimeter 140 may be mapped by a user walking through the land area 138 with the scouting unit 102, to enable the scouting unit 102 to map the one or more georeferenced points indicative of the perimeter 140 based on a location of the scouting unit 102 relative to the land area 138 as determined by the location signal receiver 114, for example. In some exemplary embodiments, the scouting unit 102 may record and transmit data of the one or more georeferenced points indicative of the perimeter 140 without mapping the perimeter 140 itself, and the perimeter 140 may be mapped by the control center 104 as will be described below. Further, in some exemplary embodiments, the scouting unit 102 may not collect information indicative of the perimeter 140, and the perimeter 140 may be mapped or otherwise determined substantially entirely by the control center 104 as will be described below. As will be appreciated by persons of ordinary skill in the art, a vehicle (e.g., a terrestrial vehicle such as a car, or an aerial vehicle such as an airplane or an autonomous aerial vehicle) may be used to enable the scouting unit 102 to traverse at least a portion of the land area 138 so as to map one or more georeferenced points indicative of the perimeter 140, one or more georeferenced points indicative of the at least one soil sampling location 142, and/or one or more georeferenced points indicative of the at least one exclusion zone 144. The perimeter 140 is shown as being partially open in FIG. 3, but it is to be understood that the perimeter 140 may be a closed perimeter 140, or a substantially closed perimeter 140 in some exemplary embodiments. Further, a series of partially open perimeters 140 may be mapped by the scouting unit 102, and may or may not be merged or otherwise incorporated into an overall perimeter 140 by the scouting unit 102 and/or by the control center 104, for example.

Referring now to FIG. 4, the one or more georeferenced points indicative of the at least one soil sampling location 142 may be any suitable geospatial location in the portion of the land area 138 in the perimeter 140 or outside the perimeter 140, and each designation of a soil sampling location 142 may include geospatial location and/or coordinates, time sampled, sampling depth(s), or other pertinent information. For example, the scouting unit 102 may designate unique identifiers for the one or more georeferenced points indicative of each soil sampling location 142 and/or for each soil sample taken such as name, geospatial location, coordinates, depth, volume, or unique number, and may capture and submit such identifiers to the control center 104 for quality control and reporting. In some embodiments, the input device 118 may include a barcode reader, and each soil sample may be labeled with a bar code, which may be scanned by the input device 118 and stored into the memory 112 and/or transmitted to the control center 104 or to a designated lab, for example.

Any desired number of georeferenced points indicative of soil sampling locations 142 may be automatically designated by the scouting unit 102 and/or manually selected or removed by a user, so that a representative contaminant profile for at least one contaminant for the portion of the land area 138 in the perimeter 140 may be generated, obtained, plotted, or otherwise determined for the land area 138 by measuring an existing level of the at least one contaminant in the soil samples from the land area 138. A user, such as a soil scientist, an agronomist, a regulatory agency or governmental or landowner representative or agent may manually designate or remove one or more georeferenced points indicative of one or more soil sampling location 142, for example, based on land-specific features and/or accepted soil sampling protocols.

The one or more georeferenced points indicative of at least one exclusion zone 144 may define or indicate any portion of the land area 138 which is unacceptable for waste stream fluids application, because of unacceptable soil textures, noncompliant or excessive slopes that promote runoff, insufficient top soil thickness, areas of shallow ground water, areas lacking an impending layer, areas around water wells, water bodies, such as lakes, ponds, rivers, streams, creeks, or other water features, drainage areas such as dry water features, dry creek beds, drainage ditches, canals, channels, diversions, agricultural waterways, or other natural or man-made areas that can channel, pool, drain, or store water. The one or more georeferenced points indicative of the at least one exclusion zone 144 may be mapped based on the respective geospatial locations or coordinates of each of these unacceptable features, objects, or areas, for example, and may include an additional safety margin and/or buffer zone if desired or required by applicable agreements and/or regulations.

In some exemplary embodiments, the one or more georeferenced points indicative of the at least one exclusion zone 144 may be automatically designated by the scouting unit 102 based on preset criteria or exclusion zone rules, and in some embodiments an operator or user of the scouting unit 102 may manually designate or remove one or more georeferenced points indicative of the exclusion zone 144 in the perimeter 140, outside the perimeter 140, or partially inside and partially outside the perimeter 140, and combinations thereof, for example. In some exemplary embodiments, the at least one exclusion zone 144 may be mapped by the scouting unit 102, and in some exemplary embodiments the at least one exclusion zone 144 may be mapped or otherwise designated by the control center 104 based on data of the one or more georeferenced points indicative of the at least one exclusion zone transmitted to the control center 104 by the scouting unit 102.

In some exemplary embodiments, additional information indicative of classification of the existing ecosystem in the land area 138 may be obtained by a user of the scouting unit 102, such as associated or planned crop systems; determination of vegetative cover (e.g., ground cover as a percent, height of vegetative cover, type of vegetation), biomass measurement, terrain slope (e.g., in degrees), and field length (e.g., a length of the longest slope until the slope breaks for vegetative buffer determination), and such additional information may be transmitted to the control center 104 and/or to the applicator unit 106.

Data indicative of the map 136, the soil sampling grid 143, and/or any additional land-specific data or information collected by the scouting unit 102 (e.g., data of the one or more georeferenced points indicative of the perimeter 140 and/or of the at least one exclusion zone 144) may be transmitted to the control center 104 via the network 108 and/or by otherwise interfacing the scouting unit 102 with the control center 104 (e.g., via a cable or docking). It is to be understood that while the map 136 is shown and described as a map image file including one or more overlaid GIS layers of data, in some exemplary embodiments, the map 136 and/or the soil sampling grid 143 may be transmitted to the control center 104 in any desired format, such as one or more data table, graph, chart, spreadsheet, or combinations thereof.

As will be appreciated by persons of ordinary skill in the art, soil samples from the soil sampling locations 142 and/or the soil sampling grid 143 may be obtained by an operator of the scouting unit 102 in some exemplary embodiments, Further, in some exemplary embodiments, a third party may accompany the operator of the scouting unit 102 and may obtain soil samples from the soil sampling locations 142 and/or the soil sampling grid 143, analyze the obtained samples, and provide the results to the scouting unit 102, the control center 104, and/or the applicator unit 106. Further, in some exemplary embodiments, the geospatial location of the soil sampling locations 142 and/or the soil sampling grid 143 may be transmitted or otherwise provided to a third party by the scouting unit 102 and/or by the control center 104, and the third party may obtain and analyze soil samples from the soil sampling locations 142 and/or the soil sampling grid 143, and provide the resulting data to the control center 104, the scouting unit 102 and/or the applicator unit 106.

Figure 5:
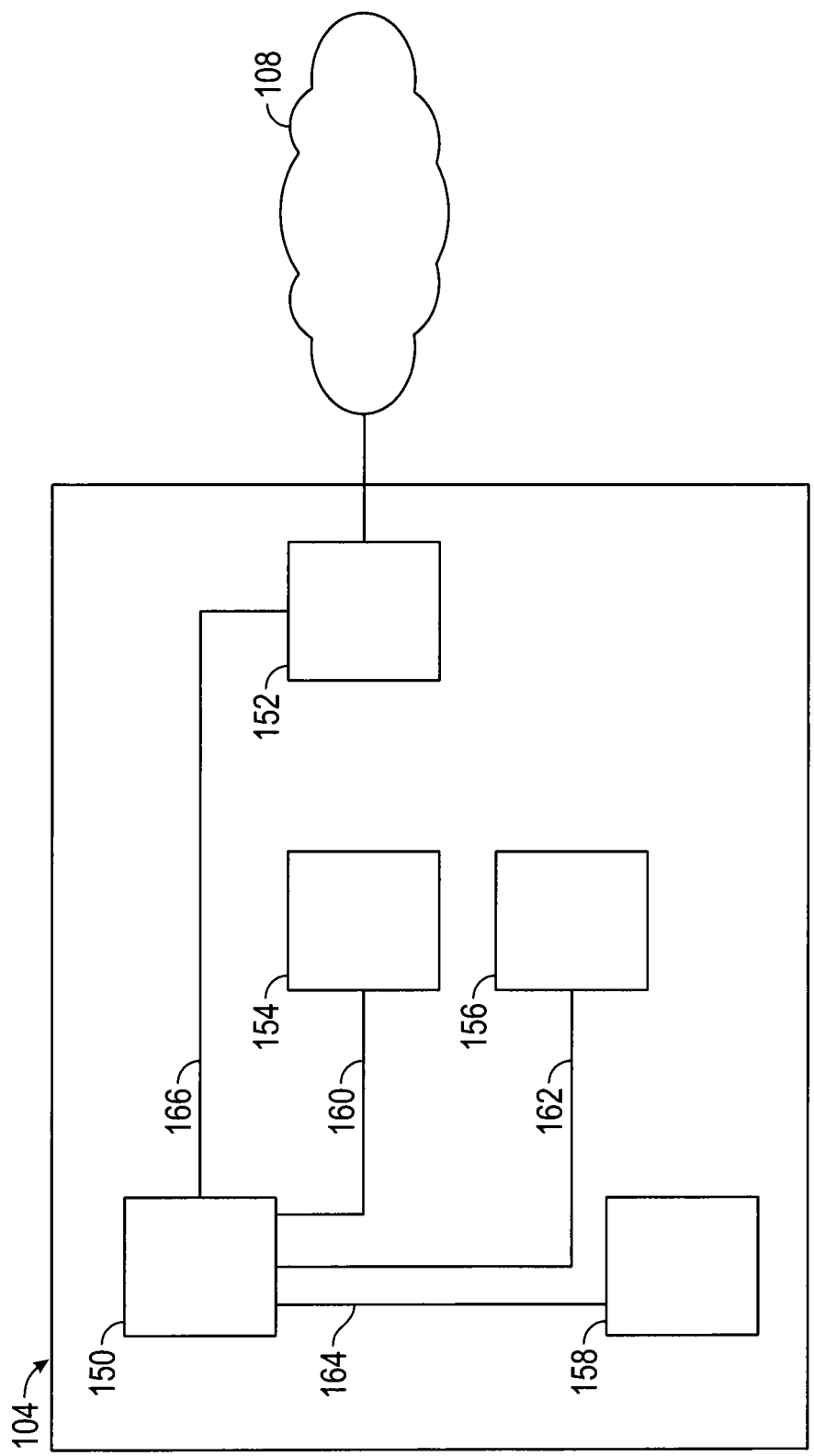
FIG. 5 is a diagram of a control center of the waste stream management system of FIG. 1.

Referring now to FIG. 5, the control center 104 may be implemented as a computing system such as a web server, and may have at least one processor 150 capable of executing processor executable code, at least one I/O port 152, one or more memory 154 storing processor executable code and/or data, an input device 156, and an output device 158, all or some of which can be partially or completely network-based or cloud-based, and not necessarily located in a single physical location. The control center 104 may be located remotely from the land area 138 and may be implemented in a stationary or mobile office, for example.

The processor 150 can be implemented similarly to the processor 110 described above, and is capable of communicating with the memory 154 via a path 160 which can be implemented as a data bus, for example. The processor 150 is capable of communicating with the input device 156 and the output device 158 via paths 162 and 164 including one or more data busses. The processor 150 may be further capable of interfacing and/or communicating with the scouting unit 102 and/or with the at least one applicator unit 106 via the at least one I/O port 152 and the network 108, such as by exchanging electronic, digital and/or optical signals via one or more physical or virtual computer ports using a network protocol such as TCP/IP, for example. The processor 150 may communicate with the at least one I/O port 152 via a path 166, which may be a data bus. The processor 150 is capable of reading and/or executing processor executable code and/or creating, manipulating, altering, and storing computer data structures into the memory 154.

The memory 154 may be implemented similarly to the memory 112 and may store data and processor executable code in the form of software and/or firmware, which includes processor executable code written in any suitable programming language, such as C++.

The input device 156 and the output device 158 may be implemented and may function similarly to the input device 118 and the output device 120, respectively.

Figure 6:
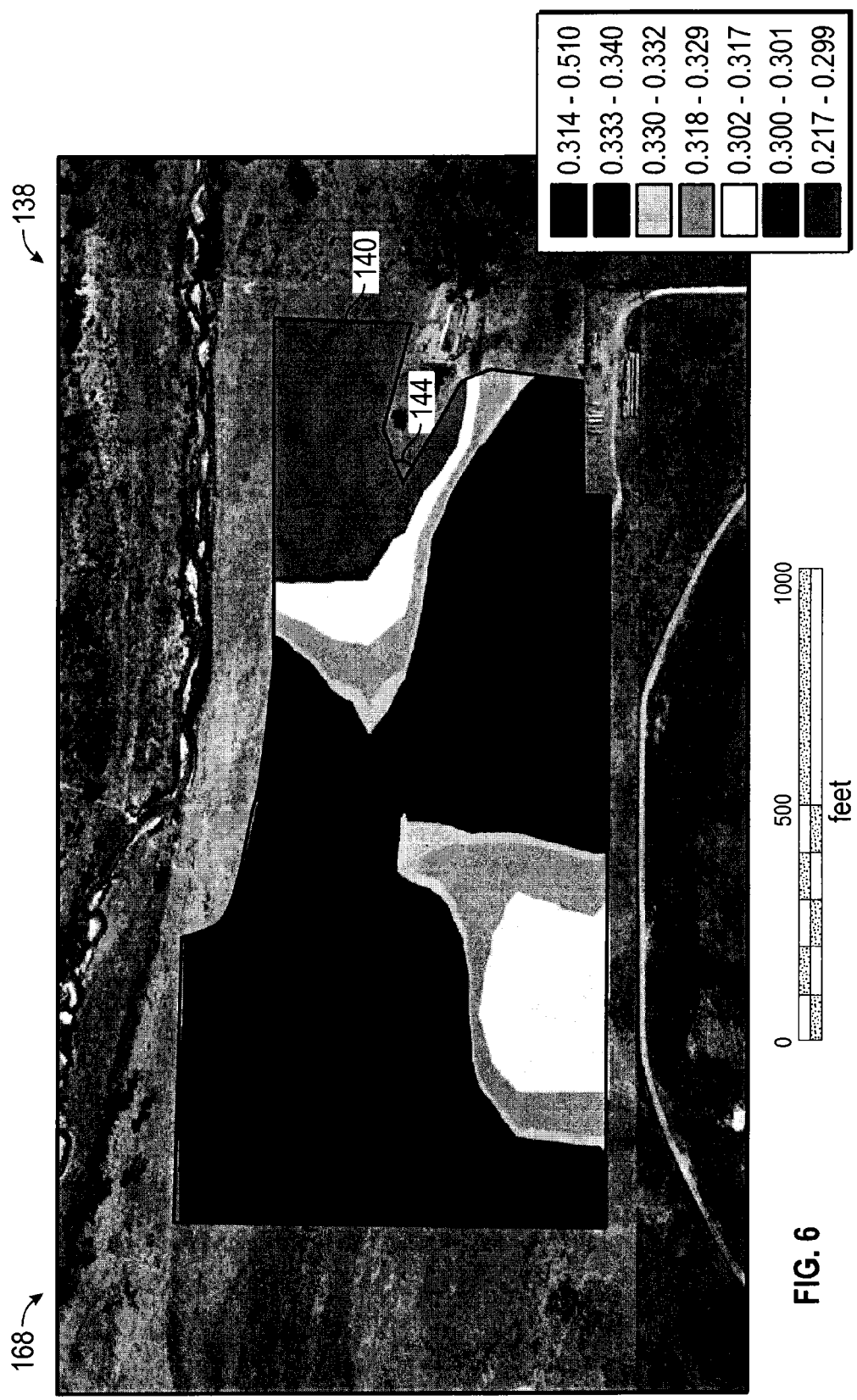
FIG. 6 is a diagram of an exemplary embodiment of a contaminant profile of the land area of FIG. 3 according to the inventive concepts disclosed herein.
Figure 7:
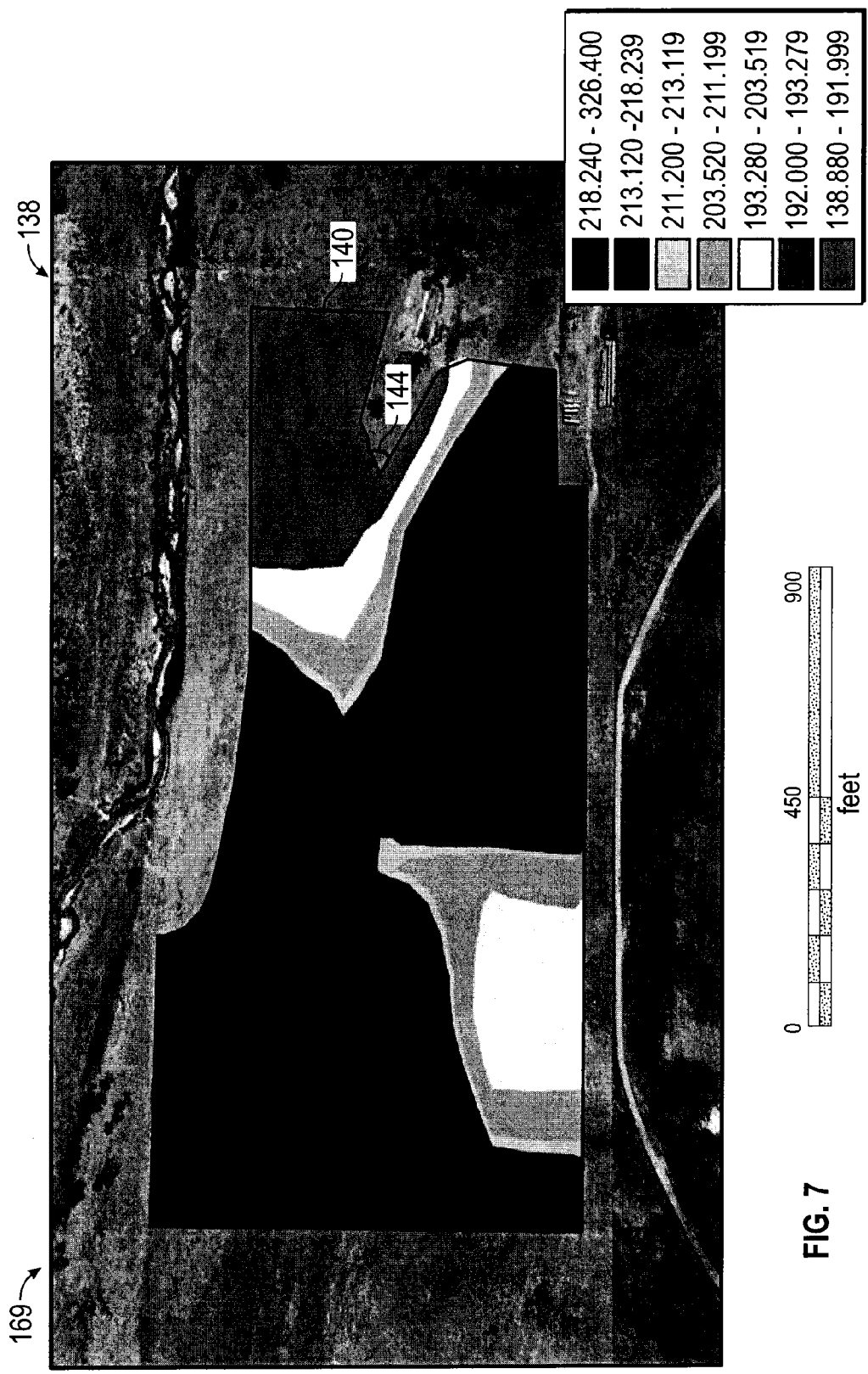
FIG. 7 is a diagram of an exemplary embodiment of the contaminant profile of FIG. 6 shown as derived total dissolvable solids amounts.

Referring now to FIGS. 6-7, the memory 154 may store processor executable code, which when executed by the processor 150 may cause the processor 150 to receive via the I/O port 152 a signal from the scouting unit 102 indicative of particular geospatial locations and/or one or more georeferenced points on the map 136, the soil sampling grid 143, and/or any additional data about the land area 138. The map 136 may include one or more georeferenced points indicative of the portion of the land area 138 in the perimeter 140, and/or one or more georeferenced points indicative of the at least one exclusion zone 144, for example. In some exemplary embodiments, the map 136 may include the perimeter 140, and/or the at least one exclusion zone 144 designated by the scouting unit 102, while in some embodiments the processor 150 may map the perimeter 140 and the at least one exclusion zone 144 by accessing data from any suitable source, such as maps of the land area 138, satellite images of the land area 138, GIS databases including data of the land area 138, and combinations thereof, for example. Further, in some embodiments, the processor 150 may map the perimeter 140 and the at least one exclusion zone 144 based at least partially on information and/or data including one or more georeferenced points indicative of the perimeter 140 and/or the at least one exclusion zone 144 received from the scouting unit 102, and on data from any suitable source, such as maps of the land area 138, satellite images of the land area 138, and/or GIS databases including data of the land area 138, for example.

The processor 150 may also access data indicative of a preexisting amount or level of at least one contaminant in at least one soil sample taken from the at least one soil sampling location 142 so as to determine a contaminant profile for at least one contaminant of the land area 138 (e.g., in the perimeter 140 and/or outside the perimeter 140). The contaminant profile of at least one contaminant in the land area 138 may be compared to state and federal standards, or customer, land owner, or ecosystem threshold where it is lower than regulatory threshold to determine a land area 138 specific threshold for the at least one contaminant, and to determine if there is existing contaminant loading capacity in the land area 138. In the event that a portion or region of the sampled land area 138 has a preexisting amount of contaminant which exceeds the allowed amount of contaminant, such portion may be designated as an exclusion zone 144 by the processor 150.

For example, data indicative of the preexisting amount or level of the at least one contaminant may be derived from the soil sample(s) taken from the at least one soil sampling location 142. The soil sample(s) may be tested as desired at any desired location, including a third-party laboratory, which may provide the resulting contaminant profile data for the at least one contaminant in the land area 138 to the control center 104 in any suitable format provided that the data is accessible by the processor 150. As shown in FIG. 6, data indicative of the soil sampling results at particular soil sampling locations 142 may be transmitted to the processor 150 over the network 108, or may be provided to the processor 150 via the input device 156, and/or otherwise stored in the memory 154 in the form of a contaminant profile 168 (e.g., a map with one or more GIS layers of overlaid data).

The contaminant profile 168 may include the perimeter 140 of the land area 138 and may show one or more overlaid GIS layers of data including a level of the at least one contaminant present in the portion of the land area 138 in the perimeter 140. As shown in FIG. 6, where soil salinity is an issue, the amount of contaminants within the soil may be determined using an electrical conductivity test for samples from the soil sampling locations 142 of the land area 138. The result of the electrical conductivity tests may be entered into the contaminant profile 168. The processor 150 may process or convert the data of the electrical conductivity to any desired format of data, such as for example to a total dissolved solids (TDS) in mg/kg, which may be overlaid on a TDS contaminant profile 169 as shown in FIG. 7. In some exemplary embodiments, the processor 150 may derive the data for the TDS contaminant profile 169 from an empirical relationship between electrical conductivity of the soil shown in the contaminant profile 168 and total dissolved solids in the soil.

The processor 150 may also access data indicative of a maximum allowable amount of the at least one contaminant (e.g., the most limiting contaminant) in the land area 138. Such data may be provided to the processor 150 via the network 108, via the input device 156, or may be stored in the memory 154. In an exemplary embodiment, the processor 150 may select at least one contaminant present in the waste stream fluids and may designate such contaminant as the most limiting contaminant for that particular land area 138 and set a maximum allowable amount of the at least one contaminant in the land area 138. The maximum allowable amount of the most limiting contaminant may be designated according to the contaminant profile of the land area 138, based on the current ecosystem in the land area 138, based on any applicable regulations, agreements with the owner of the land area 138, the expected or known contaminants in the managed waste stream, planned or current use of the land (e.g., amounts of the at least one contaminant that would adversely impact yield or quality of planned or existing crops or livestock), and combinations thereof. In some exemplary embodiments, an additional safety margin (e.g., 5%, 10%, 20%, etc.) may be built in the maximum allowable amount of the at least one contaminant in the land area 138 as desired or required.

Figure 8:
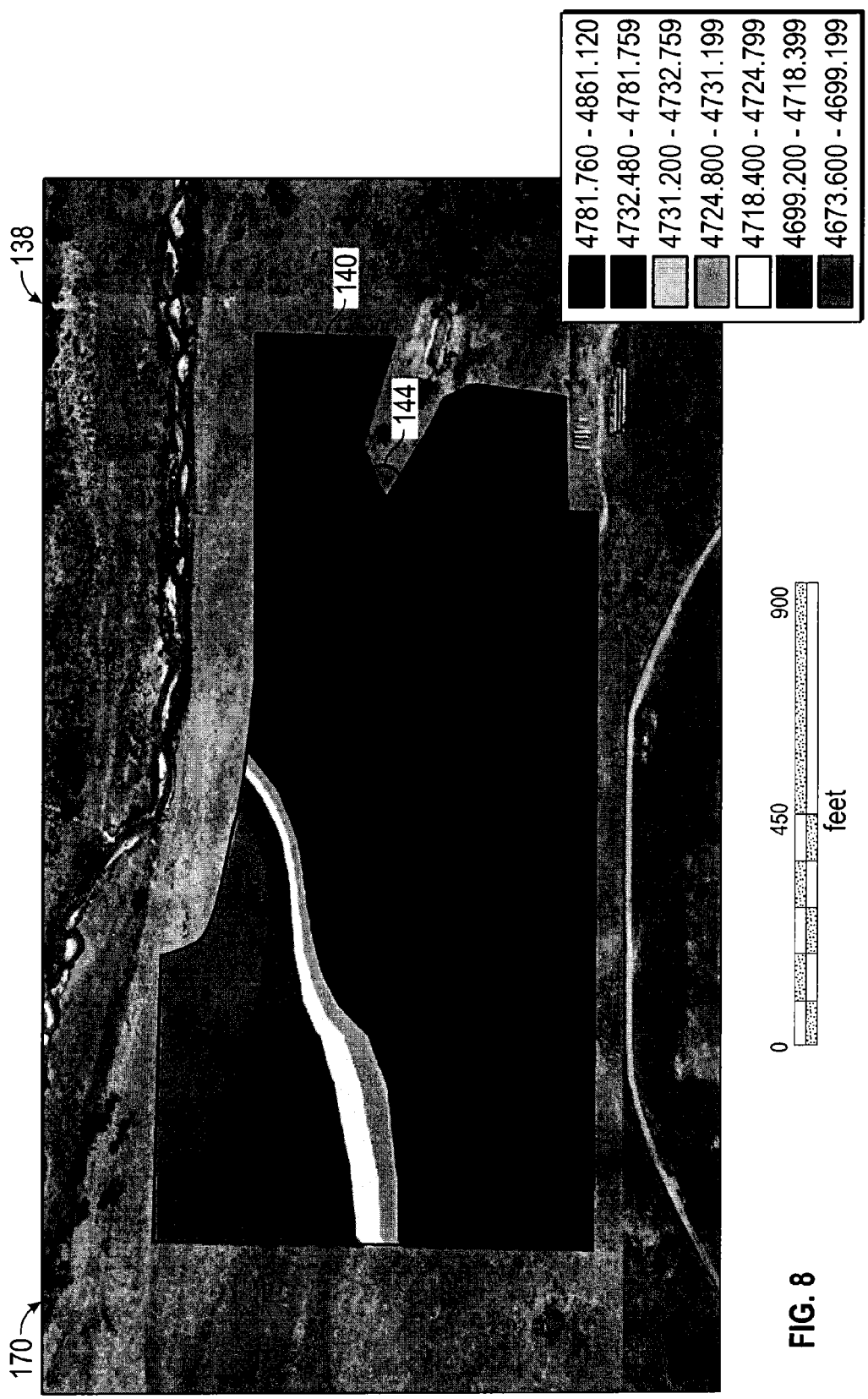
FIG. 8 is diagram of an exemplary embodiment of a contaminant capacity profile of the land area of FIG. 3.

Referring now to FIG. 8, the processor 150 may determine a contaminant capacity for the portion of the land area 138 inside the perimeter 140, indicative of an amount of at least one contaminant that can be safely applied to the portion of the land area 138 in the perimeter 140, based at least in part on a difference between the contaminant profile 168 of the at least one contaminant in the land area 138 and the maximum allowable level of the at least one contaminant in the land area 138. The determined contaminant capacity may be inputted into any suitable mapping software stored in the memory 154 and executed by the processor 150, along with any other determined exclusion zones 144, to derive a contaminant capacity profile 170 for the portion of the land area 138 in the perimeter 140 to meet applicable regulatory or other requirements and to serve as a contaminant application template for controlled application and application cutoff. It is to be understood that while the contaminant capacity profile 170 shows contaminant capacity in terms of total weight of contaminant per area, the contaminant capacity profile 170 may indicate contaminant capacity in any desired units, such as weight per area, or volume per area where the concentration of the at least one contaminant in a volume of waste stream fluids is known, for example. Further, while the contaminant capacity profile 170 is shown and described as a map having one or more GIS layers of data overlaid thereon, the contaminant capacity profile 170 may be generated and/or stored by the processor 150 in any desired data format, such as one or more data tables, spreadsheets, graphs, and combinations thereof, for example.

As part of generating the contaminant capacity profile 170, the perimeter 140 may be mapped, cropped, and/or moved by the processor 150, to provide additional safety margins according to a determination derived from a regulatory standard, customer or landowner standard or agreement, or from findings from the scouting unit 102, such as existing vegetative cover (e.g., as indication of sediment transport, contaminant sediment in this instance). Additional widths, lengths, or buffers zones may be added to the designated exclusion zones 144 and/or to the perimeter 140 so as to introduce a safety margin as desired by an operator of the control center 104, and/or as agreed upon with landowners or as mandated by applicable regulations or standards. Land area 138 characteristics such as slope, soil texture, and upslope soil cover (plant cover) influence sediment (contaminant sediment trapping) may be taken into account to determine distance requirements to trap sediments to minimize the chances of breeching applicable regulations (e.g., the Clean Water Act, state specific regulations, or simply sediment transport from the specified land area 138 itself). Additionally, land area 138 characteristics of concern, including unacceptable soil textures, noncompliant or excessive slopes that may promote runoff, top soil thickness, areas of shallow ground water, areas that lack an impending layer, water wells, water bodies such as lakes, ponds, rivers, streams, creeks, or other saturated features, drainage areas, dry water features, dry creek beds, diversions, agricultural water ways, or other natural or manmade areas that can channel or store water, may be designated as exclusion zones 144 where no waste stream fluids are to be applied, in addition to the exclusion zone(s) 144 designated by the scouting unit 102, if any. Further, any exclusion zones 144 designated by the scouting unit 102 may be reduced, enlarged, relocated, shifted, reshaped, eliminated, or otherwise modified by the processor 150.

In some exemplary embodiments, the scouting unit 102 may be provided with one or more onboard and/or portable soil analyzers (not shown), which may be operably coupled with the processor 150 and may be configured to analyze the level of one or more contaminants in the land area 138 (e.g., substantially in real time). The processor 150 may adjust the application rate substantially in real time based on data or information provided to the processor 150 by the one or more soil analyzers. Suitable soil analyzers may include spectrographic soil analyzers (e.g., microwave, terahertz, infrared, near infrared, visible and ultraviolet, x-ray, gamma, and/or acoustic or acoustic resonance spectrographic analyzers) or any other analyzers configured to determine soil spectra and/or chemical compositions (e.g., substantially in real-time). In some embodiments, the soils analyzers may include a total biomass detector, which may measure or estimate the total biomass in the land area 138 via any suitable method, such as the normalized difference vegetation index (NDVI), for example. Further, in some embodiments, the soil analyzers may include a soil electrical conductivity sensor configured to measure the electrical conductivity of the soils, for example, by injecting a known electrical current in the soil and measuring the drop in the electrical current as the current travels through the soil.

The contaminant capacity profile 170 provides governance over waste stream fluid applications, and may be stored in the memory 154 and/or may be provided to the applicator unit 106 by the processor 150, such as by transmitting a signal indicative of the contaminant capacity profile 170 to the applicator unit 106 over the network 108 for example. The contaminant capacity profile 170 is provided to the application unit 106 to ensure that no excessive application of waste stream fluids or contaminant loading occurs in respect to the most stringent contaminant threshold and to minimize the possibility of sediment transport occurring beyond the land area 138 and/or into an exclusion zone 144.

Figure 9:
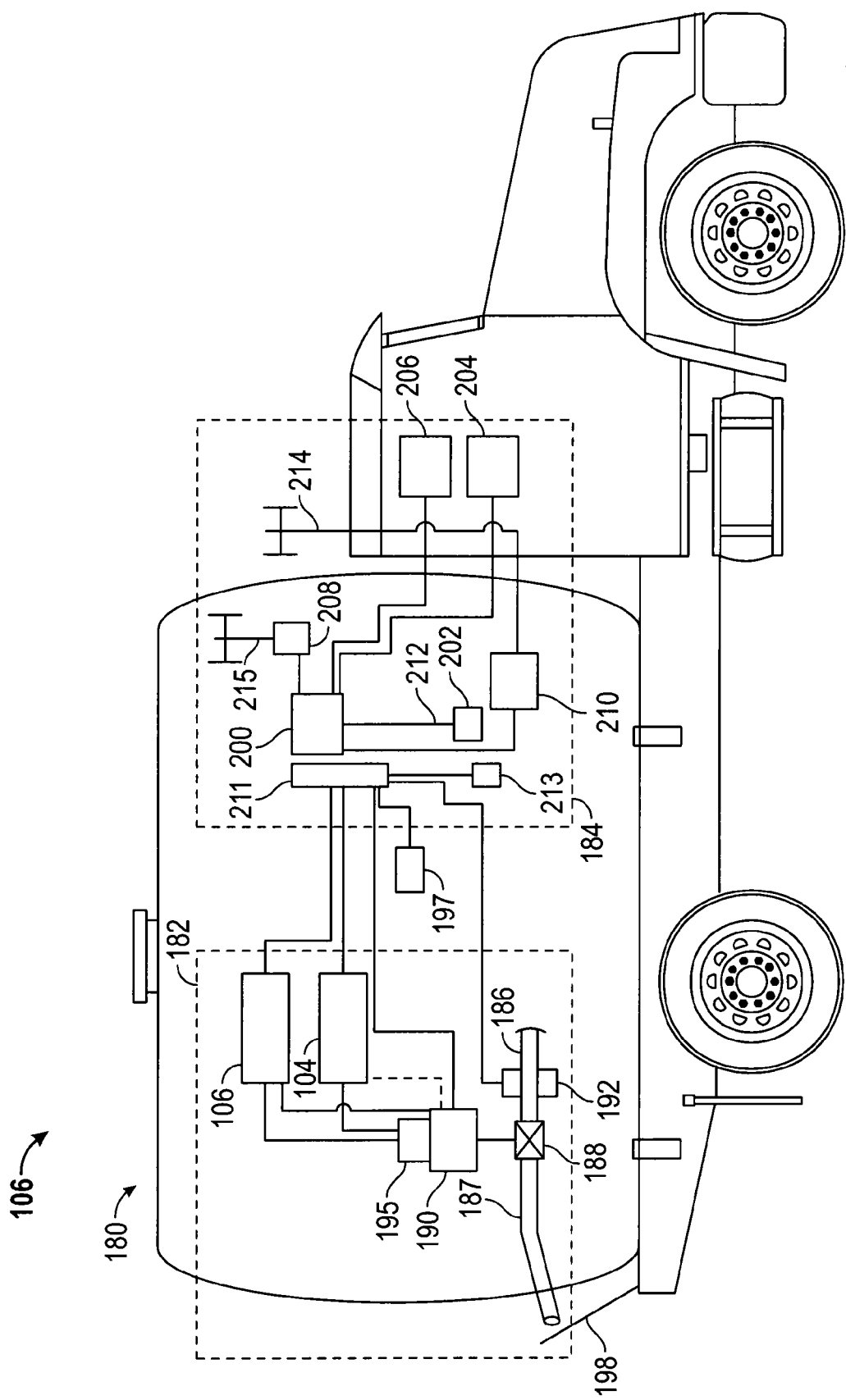
FIG. 9 is a diagram of an exemplary embodiment of an applicator unit of the waste stream management system of FIG. 1.

Referring now to FIG. 9, the applicator unit 106 may include a movable container 180, a valve assembly 182, and a controller 184.

The movable container 180 may be implemented as a tank, truck, or trailer configured to hold a volume of waste stream fluids including at least one contaminant therein, and configured to move or to be moved over at least a portion of the land area 138, for example. It is to be appreciated that the movable container 180 may be moved over the land area 138 on its own power, or by being towed by any desired vehicle, and may move or be moved over the surface of the land area 138 and/or in the airspace or air above the land area 138, for example. In some exemplary embodiments, the movable container 180 may include one or more waste stream fluid sensors, analyzers, or probes (not shown) operably coupled with the controller 184 and configured to measure, detect, or estimate, the chemical or other properties of a load of waste stream fluids loaded in the movable container 180 (e.g., substantially in real time, at preset intervals, after the load of waste stream fluids is loaded into the movable container 180, and/or prior to applying the waste stream fluids), as will be appreciated by persons of ordinary skill in the art having the benefit of the instant disclosure. The waste stream fluid sensors, analyzers, or probes may be configured to characterize the load of waste stream fluids loaded in the movable container 180 by measuring, determining, or estimating the electrical conductivity, the total dissolved solids, a concentration and/or an amount of chlorides and/or sodium present in the waste stream fluids, the pH, and/or the presence and/or concentration and/or amount of at least one contaminant present in the load of waste stream fluids. The waste stream fluid analyzers or probes may provide the resulting data or information to the controller 184, for example.

The valve assembly 182 may include a conduit 186, a variable flowrate valve 188, an actuator 190, and a flowmeter 192. The valve assembly 182 may also include an optional first control module 194, and an optional second control module 196.

The conduit 186 may be constructed of any desired materials (e.g., metals, polymers, resins) and may be configured to allow fluids to flow therethrough. The conduit 186 and the variable flowrate valve 188 may have an internal diameter greater than about 4 inches, or between about 4 inches and about 6 inches. In some exemplary embodiments, the conduit 186 may have an internal diameter of about 6 inches, or an external diameter larger than 6 inches. The conduit 186 may be fluidly coupled with the movable container 180 and may be configured to direct a volume of fluids to a diffuser 198 (e.g., a nozzle and a diffuser plate) configured to dispense fluids therefrom in a predetermined application path with a known width. In some exemplary embodiments, the conduit 186 may include a substantially straight portion 187 upstream of the variable flowrate valve 188 and configured so that fluids flowing through the substantially straight portion 187 of the conduit 186 flow in a substantially laminar fashion.

The variable flowrate valve 188 may be operably and/or fluidly coupled with the conduit 186 upstream of the diffuser 198 and/or downstream of the substantially straight portion 187, for example. The variable flowrate valve 188 may be implemented as an incrementally adjustable valve, such that the variable flowrate valve 188 may be selectively and incrementally opened or closed to allow fluids to flow therethrough at a variable flow rate. For example, the variable flowrate valve 188 may be incrementally movable between a substantially closed position where substantially no fluids flow through the variable flowrate valve 188, a first partially open position where fluids flow through the variable flowrate valve 188 at a first flowrate, and one or more second partially open positions where fluids flow through the variable flow rate at one or more second flowrates different from the first flowrate, and a substantially fully open position where fluids flow through the variable flowrate valve 188 at a maximum flowrate for that particular variable flowrate valve 188. In some exemplary embodiments, the variable flowrate valve 188 may have an internal diameter greater than about 4 inches, between about 4 inches and about 6 inches, about 6 inches, or greater than about 6 inches, for example.

The actuator 190 may be operably coupled with the variable flowrate valve 188 and may be configured to selectively and incrementally open, close, or maintain the position of the variable flowrate valve 188 in response to receiving at least one control signal. The actuator 190 may be implemented as a hydraulic, pneumatic, electrical, or solenoid-piloted device. In some exemplary embodiments, the actuator 190 may include an optional feedback positioner 195 operably coupled therewith. For example, the optional feedback positioner 195 may be implemented where the actuator 190 is a pneumatic actuator 190, and may control the air supply to the actuator 190 in response to one or more signals received by the optional feedback positioner 195 from the first and/or the second control modules 194 and 196, so as to cause the actuator 190 to selectively and incrementally open, close, or maintain the position of the variable flowrate valve 188.

The flowmeter 192 may be a magnetically induced flowmeter and may be operably and/or fluidly coupled with the conduit 186 upstream of the variable flowrate valve 188. It is to be understood that in some exemplary embodiments, the flowmeter 192 may be positioned downstream of the variable flowrate valve 188 and/or may be incorporated in the variable flowrate valve 188. The flowmeter 192 may be operably coupled with the controller 184 and may be configured to detect a volume of waste stream fluids flowing through the flowmeter 192, and to output a first signal indicative of the volume of waste stream fluids flowing through the flowmeter 192. In some exemplary embodiments, the flowmeter 192 may be coupled with the conduit 186 downstream of the substantially straight portion 187 of the conduit 186 so that fluids flowing through the conduit 186 flow through the flowmeter 192 in a substantially laminar fashion (e.g., to enhance the accuracy of the flowmeter 192). The flowmeter 192 may have an internal diameter greater than about 4 inches, varying between about 4 inches and about 6 inches, about 6 inches, or greater than about 6 inches, for example.

In some exemplary embodiments, the flowmeter 192 may include one or more waste stream fluid sensors, analyzers or probes (not shown) configured to measure, detect, or estimate, the chemical or other properties of waste stream fluids flowing through the flowmeter 192 (e.g., substantially in real time during application of the waste stream fluids to the land area 138, continuously, intermittently, at preset intervals), as will be appreciated by persons of ordinary skill in the art having the benefit of the instant disclosure. The waste stream fluid sensors, analyzers or probes may be configured to characterize the waste stream fluids flowing through the flowmeter 192 by measuring, determining, or estimating the electrical conductivity, the total dissolved solids, a concentration and/or an amount of chlorides or sodium present in the waste stream fluids, the pH, and/or the presence and/or concentration and/or amount of at least one contaminant present in the load of waste stream fluids. The flowmeter 192 may provide the resulting data or information to one or more of the controller 184, the optional first control module 194, and the optional second control module 196, for example.

The optional first control module 194 may be operably coupled with the flowmeter 192, the actuator 190 (or the optional feedback positioner 195), and the controller 184, and may be configured to receive the signal indicative of the volume of waste stream fluids flowing through the flowmeter 192, quantify the volume of waste stream fluids flowing through the flowmeter 192, and transmit a signal indicative of the volume of waste stream fluids flowing through the flowmeter 192 to the controller 184. The optional first control module 194 may further be configured to transmit a control signal to the actuator 190 (or the optional feedback positioner 195), to cause the actuator 190 to open, close, or maintain the position of the variable flowrate valve 188.

The optional second control module 196 may be operably coupled with the flowmeter 192, the actuator 190 (or the optional feedback positioner 195), and the controller 184, and may be configured to receive a signal indicative of the volume of fluids flowing through the flowmeter 192, quantify an amount of the at least one contaminant flowing through the flowmeter 192, and transmit a signal indicative of the amount of the at least one contaminant applied to the land area 138 to the controller 184. In some exemplary embodiments, the second control module 196 may quantify the amount of the at least one contaminant in terms of weight of contaminant per area. The optional second control module 196 may further be configured to transmit a control signal to the actuator 190 (or the optional feedback positioner 195), to cause the actuator 190 to incrementally open, close, or maintain the position of the variable flowrate valve 188. Further, in some exemplary embodiments, the second control module 196 may receive a signal from the controller 184 indicative of a concentration of the at least one contaminant in the load or volume of waste stream fluids that are loaded in the movable container 180 and/or being dispensed by the applicator unit 106.

In some exemplary embodiments, an optional pressure switch 197 may be operably coupled with the movable container 180 and may be configured to detect or otherwise measure the pressure inside the movable container 180 and to provide a signal indicative of the pressure inside the movable container 180 being below a predetermined level used for optimal application, which may cause the controller 184 and/or the actuator 190 to at least partially close the variable flowrate valve 188. Further, an optional pneumatic pump (not shown) may be fluidly coupled with the movable container 180 and may be utilized to introduce a volume of gas into the movable container 180 so as to maintain the pressure in the movable container 180 above the predetermined pressure.

The controller 184 may include at least one processor 200, a memory 202, an input device 204, and output device 206, a location signal receiver 208, an optional transceiver 210, and at least one I/O port 211.

An optional master switch 213 may be coupled with the processor 200 and may be configured to close the variable flowrate valve 188, or to activate or deactivate the valve assembly 182, for example.

The processor 200 may be implemented similarly to the processor 110 and/or the processor 150 and is configured to read and execute processor executable code. The memory 202 may be operably coupled with the processor via a path 212 which may be implemented as a data bus, for example.

The memory 202 may be implemented and may function similarly to the memory 112 and/or the memory 154, and may store data and processor executable code in the form of software and/or firmware.

The input device 204 and the output device 206 may be implemented and may function similarly to the input device 118 and/or 160, and the output device 120 and/or 162 respectively. In some exemplary embodiments, where the movable container 180 is implemented as a truck, the input device 204 and/or the output device 206 may be provided in a cab or operator compartment of the truck so as to be accessible to the operator of the truck as shown in FIG. 9.

The location signal receiver 208 may be configured to receive a signal indicative of a geospatial location and/or to determine a geospatial location, speed, tilt, pitch, roll, and/or yaw, of the movable container 180 relative to a land area 138, such as the land area 138 from at least one geospatial location signal received by the location signal receiver 208. The location signal receiver 208 may include an antenna 215 configured to receive a geospatial location signal from any suitable global navigation, geospatial location, or positioning system, such as GPS, LORAN, GNSS, a cellular network tower, or any other desired source indicative of a geospatial location or position of the location signal receiver 208, including latitude, longitude, and elevation, for example. In some exemplary embodiments, the location signal receiver 208 may be configured to determine a speed of the movable container 180 based on at least one signal received by the location signal receiver 208, for example. Further, in some exemplary embodiments the movable container 180 may include a speedometer (not shown) which may be coupled with the processor 200 and may provide the processor 200 with data indicative of a speed of the movable container 180 when the movable container 180 moves over the land area 138.

The optional transceiver 210 may be implemented as any desired wireless or wired device configured to receive and/or transmit one or more wireless or wired signals, so that the transceiver 210 may function as a wireless connection hotspot, for example. Further, the transceiver 210 may function to wirelessly connect the applicator unit 106 with the control center 104 and/or the scouting unit 102 and/or a second applicator unit 106, via any desired wireless network, such as the network 108, a satellite network, a Wi-Fi network, a cellular network, a microwave network, a radio signal network, and combinations thereof. One or more suitable antennas 215 may be implemented with the transceiver 210 to receive or transmit one or more signals, for example. In some exemplary embodiments, the transceiver 210 may be configured to allow a first applicator unit 106 to act as a wireless hotspot so as to enable bidirectional wireless communication of signals and/or data between the first applicator unit 106 and one or more second applicator units 106 in the field, such that data indicative of the volume of waste stream fluids and/or amount of contaminant applied by each of the applicator units 106, and the geospatial location and amount of waste stream fluid application may be synchronized between one, two or more, or multiple applicator units 106, and/or the control center 104, for example.

The memory 202 may store processor executable code, and data including the contaminant capacity profile 170 of the portion of the land area 138 in the perimeter 140, which may be provided to the applicator unit 106 by the control center 104, such as via the transceiver 210, for example. The memory 202 may also store data indicative of a concentration of the at least one contaminant in a load or volume of waste stream fluids loaded or otherwise provided in the movable container 180. In some exemplary embodiments, the contaminant capacity profile 170 and the concentration of the at least one contaminant in a load or volume of waste stream fluids may be used to generate a set of current application rules by the processor 200, which set of current application rules may be stored in the memory 202.

The set of current application rules may include engine kill signals, or rules for reducing, increasing, starting, or stopping application of waste stream fluids upon intersecting any previous waste application paths within the current waste application path. In some exemplary embodiments, the set of current application rules may be derived from a preset formula, and/or may encompass additional weight per area and/or volume per area calculations for at least one contaminant which is the most limiting factor for the portion of the land area 138 in the perimeter 140.

For example, the processor executable code stored in the memory 202, when executed by the processor 200, may cause the processor 200 to access the location and the speed of the movable container 180 relative to the land area 138, access the contaminant capacity profile 170 of the portion of the land area 138 in the perimeter 140, access data indicative of a concentration of the at least one contaminant in the volume of waste stream fluids loaded in the movable container 180, determine a set of current application rules including a flowrate for the volume of waste stream fluids to be applied to the portion of the land area 138 in the perimeter 140 based at least in part on the location of the movable container 180 relative to the land area 138, the contaminant capacity profile 170 for the at least one contaminant, and the concentration of the at least one contaminant in the volume of waste stream fluids in the movable container 180. The processor 200 may transmit a control signal to the actuator 190 based on the set of current application rules, directing the actuator 190 to open, close, or maintain the position of the variable flowrate valve 188 so that the volume of waste stream fluids is applied to the portion of the land area 138 in the perimeter 140 at the determined flowrate and according to the set of current application rules.

For example, the set of current application rules may specify volume-per-area, or weight-per-area of any quantifiable contaminant that has a maximum allowable amount in the land area as specified by a governmental body, customer, or land owner (whichever has the most stringent standard). In some embodiments, the set of current application rules may be calibrated to the discharge rate of the particular applicator unit 106 (e.g., application path width, time to unload the volume of the movable container 180), and the set of current application rules may be configured to meet these parameters. Upon verification of the calibration of these parameters, the set of current application rules may be essentially mated to the particular applicator unit 106 and may allow for any flowrate the applicator unit 106 may achieve if the specific set of current application rules allow for application. The set of current application rules may be job specific, customer specific, state specific, land owner specific, crop system specific, and combinations thereof, and may set the contaminant loading parameters that are fed from inputting waste stream fluid characteristics determined through field testing based upon the internal calculations that occur within the controller 184.

In some exemplary embodiments, the processor 200 may transmit a control signal to the actuator 190 (or to the optional feedback positioner 195) by transmitting a volume control signal to the first control module 194 indicative of the total volume of waste stream fluids to be applied to the portion of the land area 138 in the perimeter 140, and/or by transmitting a contaminant amount control signal to the second control module 196 indicative of the total amount of the at least one contaminant to be applied to the portion of the land area 138 in the perimeter 140. The first control module 194 may transmit a first control signal to the actuator 190 (or to the optional feedback positioner 195) and the second control module 196 may transmit a second control signal to the actuator 190 (or to the optional feedback positioner 195) directing the actuator 190 to incrementally open, close, or maintain the position of the variable flowrate valve 188, for example. Further, in some exemplary embodiments, the processor 200 may transmit one or more control signals directly to the actuator 190 (or to the optional feedback positioner 195), and the first and second control modules 194 and 196 may be omitted.

The processor 200 may update the contaminant capacity profile 170 of the portion of the land area 138 in the perimeter 140 based on the amount of the at least one contaminant applied to the portion of the land area 138 in the perimeter 140 by the applicator unit 106 and/or by one or more second applicator units 106. The processor executable code may further cause the processor 200 to transmit a signal indicative of the total volume of waste stream fluids and the total amount of the at least one contaminant applied to the portion of the land area 138 in the perimeter 140 to the control center 104 and/or to another applicator unit 106, such as via the wireless transceiver 210, for example.

In some exemplary embodiments, to simplify the development of the contaminant capacity profile 170 and/or the set of current application rules for a broader range of waste stream fluids (e.g., with varying contaminant concentrations) from a live waste stream, one or more contaminant capacity profiles 170 may be generated by the control center 104 and/or provided to the applicator unit 106 to encompass a broad range of concentrations of the at least one contaminant included in the waste stream fluids. In order to properly characterize each load of waste stream fluids provided to the applicator unit 106, the controller 184 of the applicator unit 106 may store one or more of the contaminant capacity profiles 170, and may generate two or more sets of current application rules configured to govern the application of preset sets, groupings, or categories of similar-type contaminant concentrations or ranges of concentrations that characterizes the live waste stream into manageable, and distinct sets of contaminant concentrations. While each load provided to the applicator unit 106 may be put into a set and the difference in contaminant concentrations within a set may be insignificant, the actual resulting total applied contaminant amount may be at or slightly less than the total applied amount measured and recorded by the applicator unit 106 at the point of application, for example.

Since the contaminant capacity profile 170 determines contaminant loading capacity (along with other exclusions) of the portion of the land area 138 in the perimeter 140, and the waste stream characterization determines the contaminant concentration of the load of waste stream fluids provided to the applicator unit 106, enough information is available to facilitate precision management of waste stream fluids by the waste stream management system 100 according to the inventive concepts disclosed herein. The precision resulting from the inventive concepts disclosed herein provides a well-documented audit trail, and allows quality control of contaminant loading.

For controlled management of a waste stream to be carried out by the waste stream management system 100, the concentration of the at least one contaminant in the waste stream fluids may be characterized either on a per "batch" basis or on a per "load" basis. Determining contaminant concentration on a batch-basis may be implemented for waste stream fluids stockpiles that have no incoming or additional waste stream fluids added to the total waste stream fluids stockpile, in such a fashion that the chemical composition (e.g., contaminant concentration or amount present) of the waste stream fluids stockpile doesn't change over the period of time the waste stream fluids from the stockpile are deposited on a land area such as the portion of the land area 138 in the perimeter 140. In this case, representative samples of the waste stream fluids batch, in combination with appropriate laboratory analysis to characterize contaminant concentration and/or composition of the waste stream fluids batch, are used to determine the at least one contaminant which is the most limiting factor for a particular land area 138 and the respective concentration of the at least one contaminant. The contaminant concentration results can be incorporated into the contaminant capacity profile 170 generated by the control center 104 to create contaminant capacity rules that provides governance over the application through a determination of a volumetric threshold which results in a prescribed or desired contaminant application rate (e.g., on a volume basis). As will be appreciated by persons of ordinary skill in the art having the benefit of the instant disclosure, in some exemplary embodiment of batch application where the concentration of the at least one contaminant in the batch of waste stream fluid is known, the contaminant capacity profile may specify the amount of contaminant solely on volumetric basis, without specifying the weight of contaminant per area applies, as the weight of contaminant per area may be readily derived from the volume of waste stream fluids with known contaminant concentration applied to the portion of the land area 138 in the perimeter 140.

In cases where a live waste stream is managed by the waste stream management system 100, the contaminant characteristics of the live waste stream fluids vary between loads supplied to the applicator units 106. For example, waste fluids may be continually or intermittently added to a batch of waste stream fluids stored in a holding facility, or may be provided to the applicator units 106 directly from a wellbore. To accurately determine the amount or concentration of at least one contaminant present in a load of waste stream fluids from a live waste stream, a load-based testing protocol according to the inventive concepts disclosed herein may be deployed for each load, unless a batch is segregated from the live waste stream, in which case the batch testing may be carried out for the separated batch as described above. In some exemplary embodiments of the inventive concepts disclosed herein, concentration (e.g., density per volume) of a contaminant may be used as a threshold measure of the amount of contaminant present, and may be simplified in batch applications.

Live waste streams may be characterized in the field for each load of waste stream fluids provided to an applicator unit 106 by using field testing equipment or by employing an onsite or mobile laboratory to identify at least one contaminant which is the most limiting factor on a per load basis and its corresponding concentration of waste stream fluids in the load. The concentration of the at least one contaminant in each load may be determined through waste stream fluid characterization, by testing performed through various field testing methods and tools such as silver titration, Electrical Conductivity meter, Chloride Meter, TDS Meter, Infrared Analysis Methods (InfraCal), Elemental analysis by a portable XRF analyzer, etc. or through approved (EPA) lab methods), which results in recording a real time log and control of as applied contaminant loading (EC, CHL, TDS, RCRA Metals, Organics, Analytes, etc.).

Since loads for each application unit 106 have approximately the same volume, contaminant density changes on a variable waste stream may be quantified and inputted into the controller 184 configured for a specific applicator unit 106 along with the contaminant capacity profile 170 for the land area 138 to provide governance. In some exemplary embodiments, the contaminant density changes in a variable waste stream may be quantified in terms of weight of contaminant per area to be applied to the portion of the land area 138 in the perimeter 140 during the application of that particular load of waste stream fluids, and the applicator unit 106 may measure and log both the applied weight of contaminant per area and the volume of waste stream fluids applied per area of the portion of the land area 138 within the perimeter 140.

As will be appreciated by persons of ordinary skill in the art, a waste stream management system 100 according to the inventive concepts disclosed herein may quantify the amount of contaminant in the contaminant capacity profile 170 and/or the amount of contaminant applied to the portion of the land area 138 in the perimeter 140 as volume of waste stream fluids applied per area, or as weight of contaminant applied per area, or both. Further, in some exemplary embodiments, the contaminant management system may quantify the amount of contaminant in the contaminant capacity profile 170 and/or the amount of contaminant applied to the portion of the land area 138 in the perimeter 140 solely as volume of waste stream fluids applied per area, and in some exemplary embodiments the contaminant management system may quantify the amount of contaminant in the contaminant capacity profile 170 and/or the amount of contaminant applied to the portion of the land area 138 within the perimeter 140 solely as weight of contaminant applied per area, as will be understood by persons of ordinary skill in the art.

In some exemplary embodiments, where more than one applicator unit 106 is operating in the same land area 138 (e.g., within the same perimeter 140, or within one or more separate perimeters 140) and/or in different land areas 138, the processor executable code may further cause the processor 200 of a first applicator unit 106 to receive a wireless signal (e.g., via the transceiver 210) indicative of an amount of the at least one contaminant applied to the land area 138 from a second applicator unit 106 and a geospatial location of the applied amount of the at least one contaminant in the land area 138, and to update the contaminant capacity profile 170 of the land area 138 based on the amount of the at least one contaminant applied to the land area 138 by the second applicator unit 106.

Figure 10:
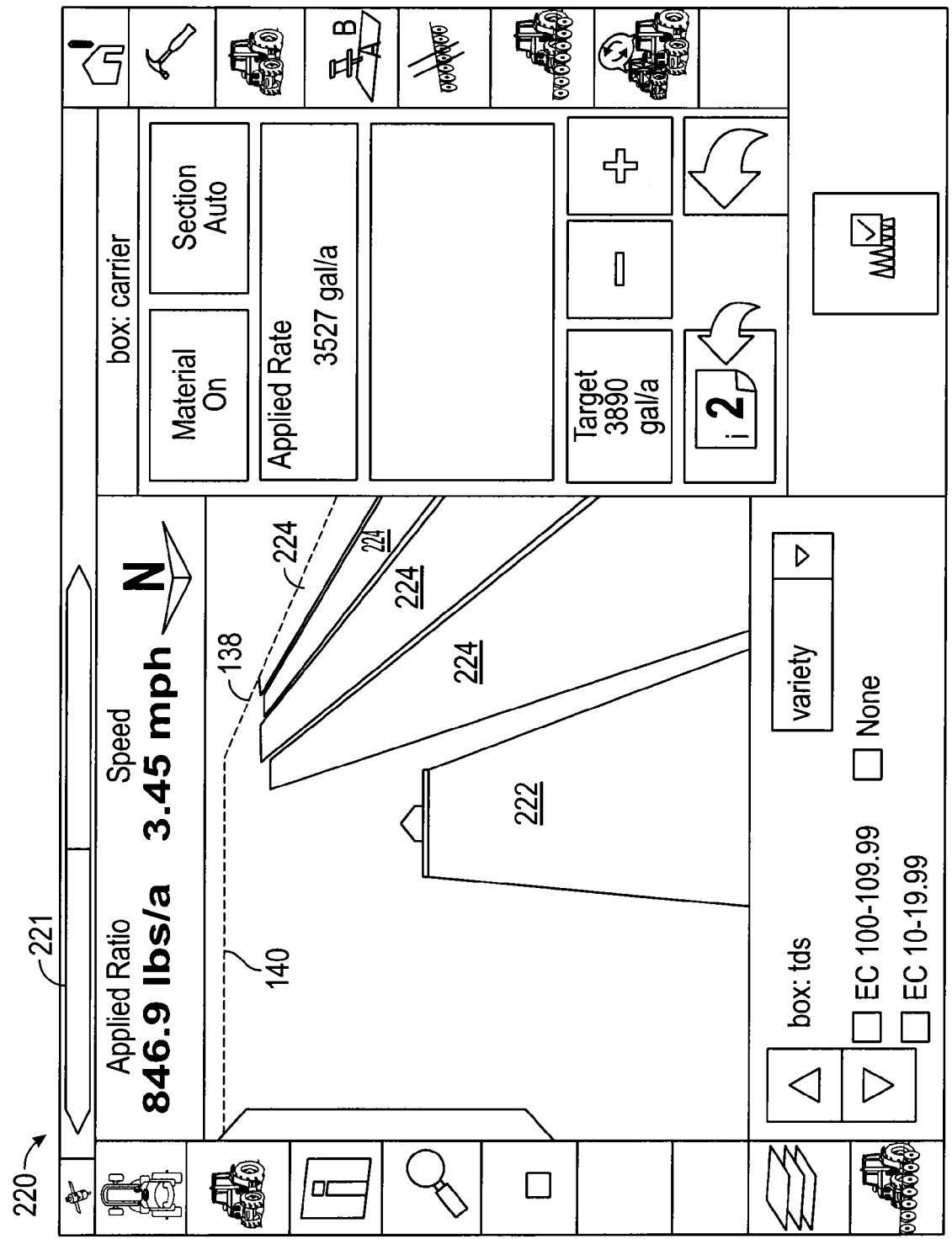
FIG. 10 is an exemplary screenshot showing application rate monitoring by the applicator unit of FIG. 9.

A display screen 220 may be displayed to an operator of the applicator unit 106 as shown in FIG. 10 in some exemplary embodiments. The display screen 220 may indicate the current and total volume of waste stream fluids and/or amount (e.g., weight per area) of contaminant applied to the portion of the land area 138 in the perimeter 140, and/or may display the perimeter 140, the at least one exclusion zone 144, and may show the current waste application path 222 and any previous waste application paths 224 within the same application pass. Further, the display screen 220 may indicate a variety of information, such as direction of travel of the movable container 180, speed of the movable container 180, the position of master switch 213, maximum allowable level of at least one contaminant, or any other desired information, as will be appreciated by persons of ordinary skill in the art having the benefit of the instant disclosure. In some exemplary embodiments, the display screen 220 may provide a steering assist indicator 221 (e.g., any desired graphical user interface element configured to indicate visually, audibly, or via haptic feedback to an operator of the applicator unit 106 a direction in which to steer the applicator unit 106 and/or a degree of steering input or correction suggested substantially in real time) as will be described below. For example, as shown in FIG. 10, the steering assist indicator 221 may indicate that the current direction of travel of the movable container 180 is to be maintained by displaying a vertical line substantially centered into a directional bar, or in any other suitable manner perceivable by the operator of the movable container 180 as will be appreciated by persons of ordinary skill in the art having the benefit of the instant disclosure.

In some exemplary embodiments, the memory 202 may store processor executable code, which when executed by the processor 200 may cause the processor 200 to provide steering assist to an operator of the applicator unit 106, such as via the steering assist indicator 221. For example, as shown in FIGS. 11-13, the processor 200 may optionally provide an operator of the movable container 180 with perimeter control, exclusion zone control, and overlap control.

Figure 11:
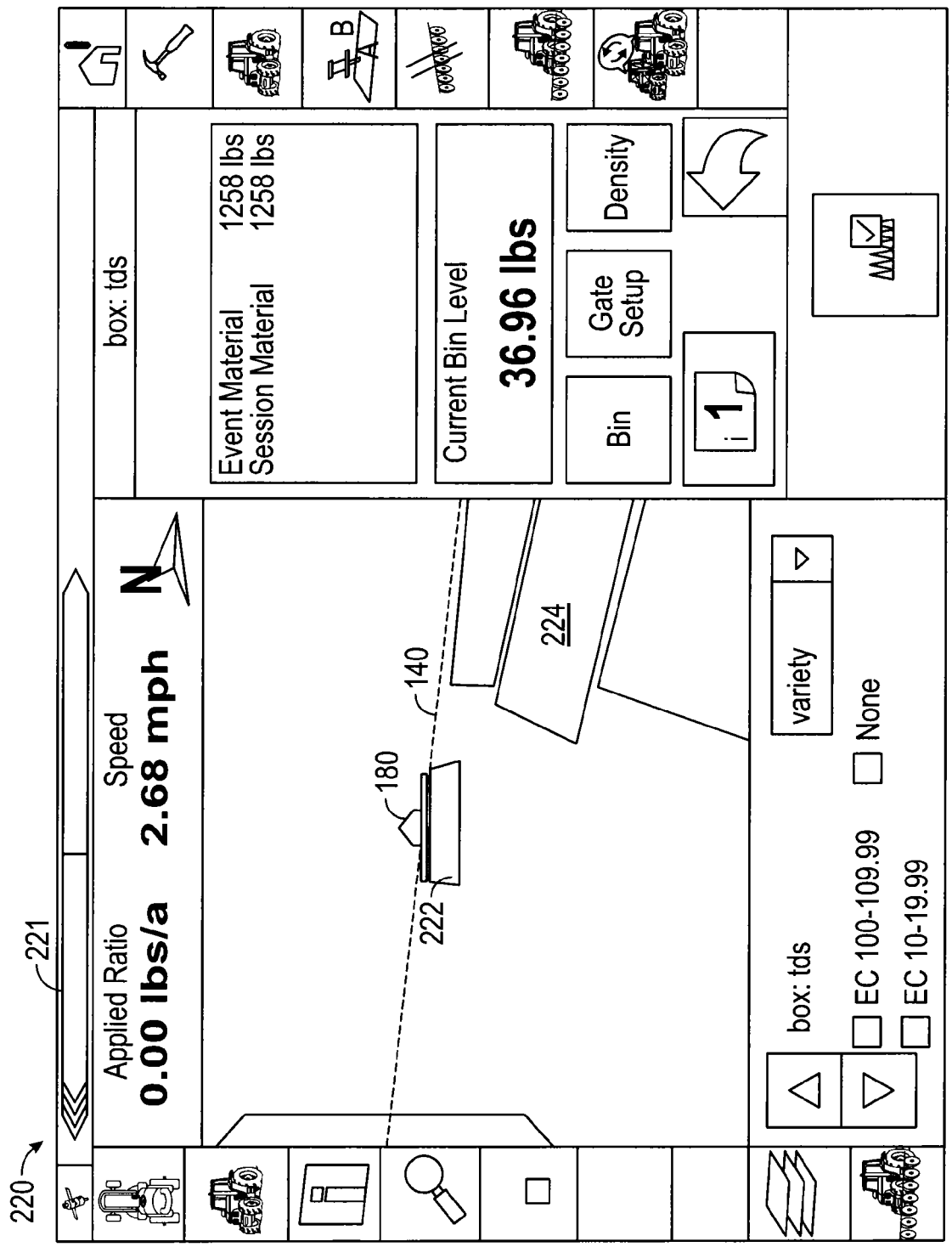
FIG. 11 is an exemplary screenshot showing perimeter control by the applicator unit of FIG. 9.

Referring now to FIG. 11, the display screen 220 may display the perimeter 140, and may discontinue application of waste stream fluids as the movable container 180 approaches or crosses the perimeter 140. For example, application has been stopped as the current waste application path 222 ends inside the perimeter 140 as the movable container 180 crosses the perimeter 140. The steering assist indicator 221 may provide guidance via an alert or indication (e.g., visual, audible, or haptic) to the operator of the applicator unit 106 to turn around and reenter the perimeter 140 (e.g., substantially in real time), for example. In some embodiments, the steering assist indicator may display one or more arrow indicators adjacent to an end of a directional bar, toward which arrows the operator of the applicator unit 106 is to steer. For example, when the operator of the applicator unit 106 is to make a U-turn or turn the applicator unit 106 around, the arrow indicators may be shown substantially at an end of the directional bar (e.g., the left end in this instance).

Figure 12:
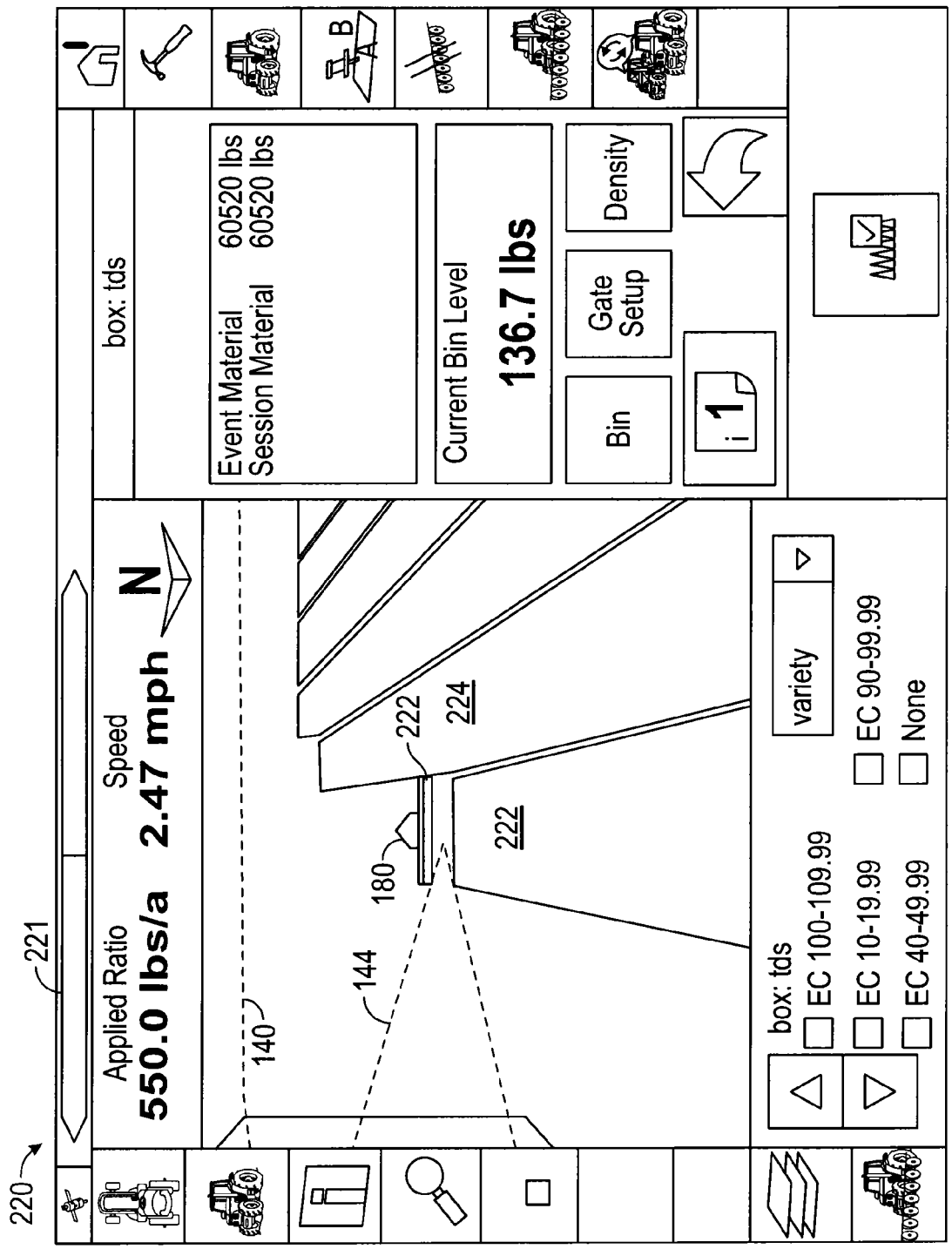
FIG. 12 is an exemplary screenshot showing exclusion zone control by the applicator unit of FIG. 9.

Referring now to FIG. 12, exclusion zone control may be provided where the current waste application path 222 of the movable container 180 would partially or completely intersect or breach an exclusion zone 144. The processor 200 may stop application by causing the controller 184 to close the variable flowrate valve 188, and may resume application once the current waste application path 222 is clear of the exclusion zone 144. Displaying the exclusion zones 144 may assist the operator of applicator unit 106 to avoid intersecting, glancing, or breaching exclusion zones with the current waste application path 222 if possible. The steering assist indicator 221 may provide guidance via an alert or indication (e.g., visual, audible, or haptic) to the operator of the applicator unit 106 to steer so that the instances of the current waste application path 222 intersecting an exclusion zone 144 are minimized or substantially eliminated (e.g., substantially in real time).

Figure 13:
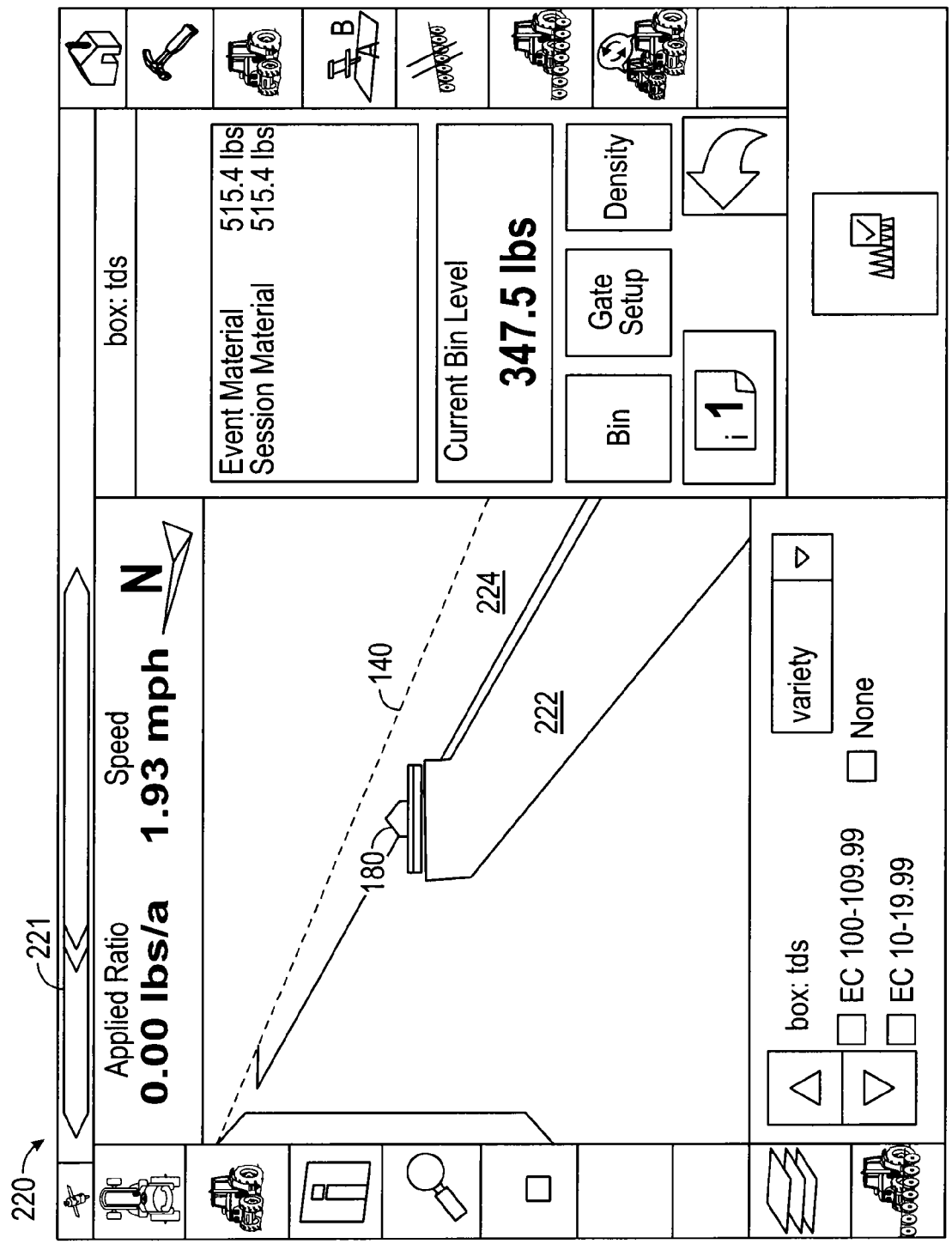
FIG. 13 is an exemplary screenshot showing overlap control by the applicator unit of FIG. 9.

Referring now to FIG. 13, overlap control may be provided where the current waste application path 222 would intersect or overlap a previous waste application path 224. In this case, the processor 200 may cause the actuator 190 to close the variable flowrate valve 188, and application may be resumed when the current waste application path 222 is clear from the previous waste application path 224, as will be appreciated by persons of ordinary skill in the art having the benefit of the instant disclosure. The steering assist indicator 221 may provide guidance via an alert or indication (e.g., visual, audible, or haptic) to the operator of the applicator unit 106 to steer so that the instances of the current waste application path 222 intersecting with a previous waste application path 224 (e.g., from the current or from a previous application pass, or from an application pass by a second applicator unit 106) are minimized or substantially eliminated. For example, the steering assist indicator 221 may display one or more arrows away from the center of the directional bar, indicating the direction into which the operator of the applicator unit 106 is to steer and/or the degree of steering input required (turn left in this instance).

Figure 14:
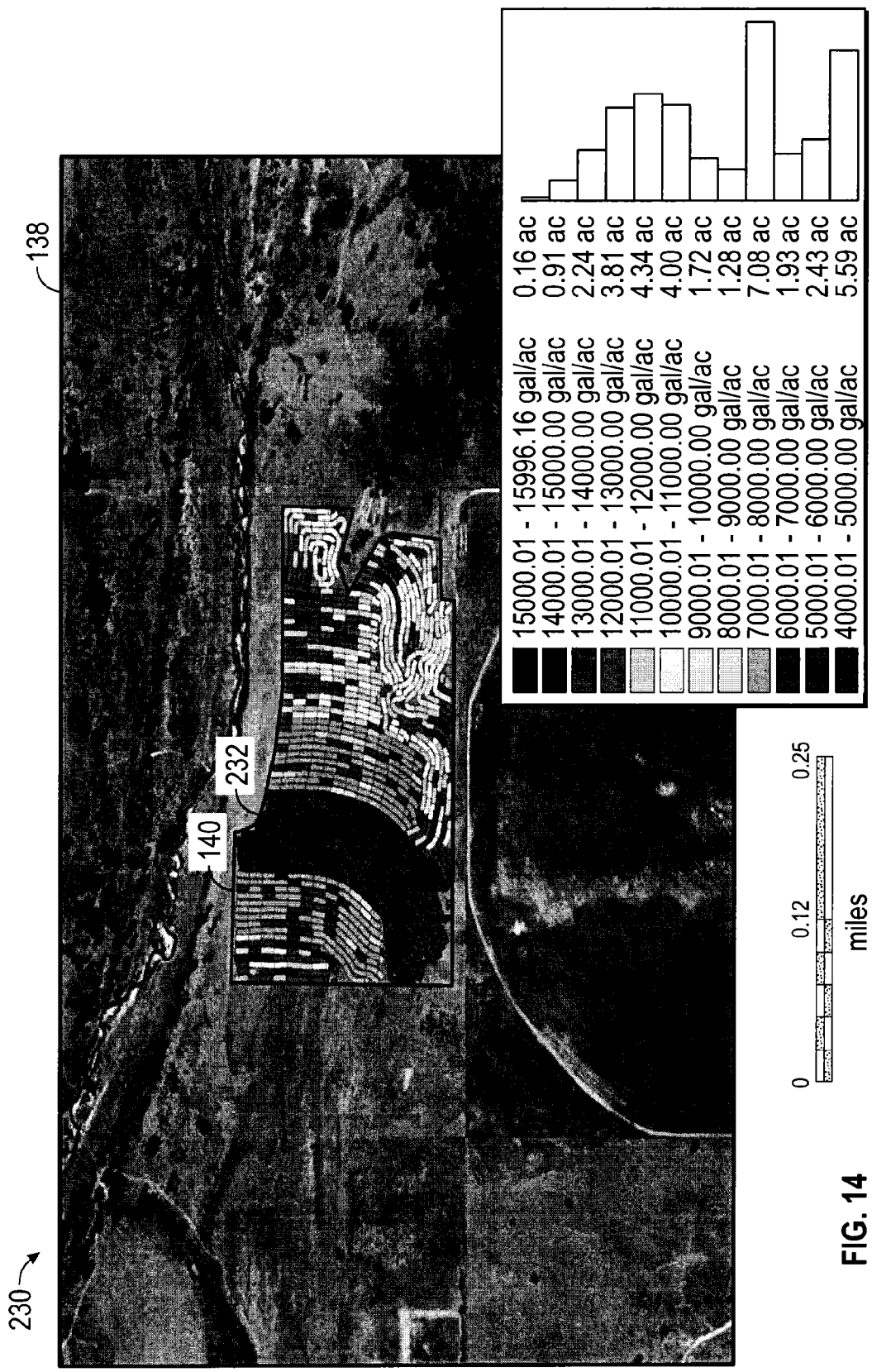
FIG. 14 is an exemplary log profile of applied volume of waste stream fluids according to the inventive concepts disclosed herein.
Figure 15:
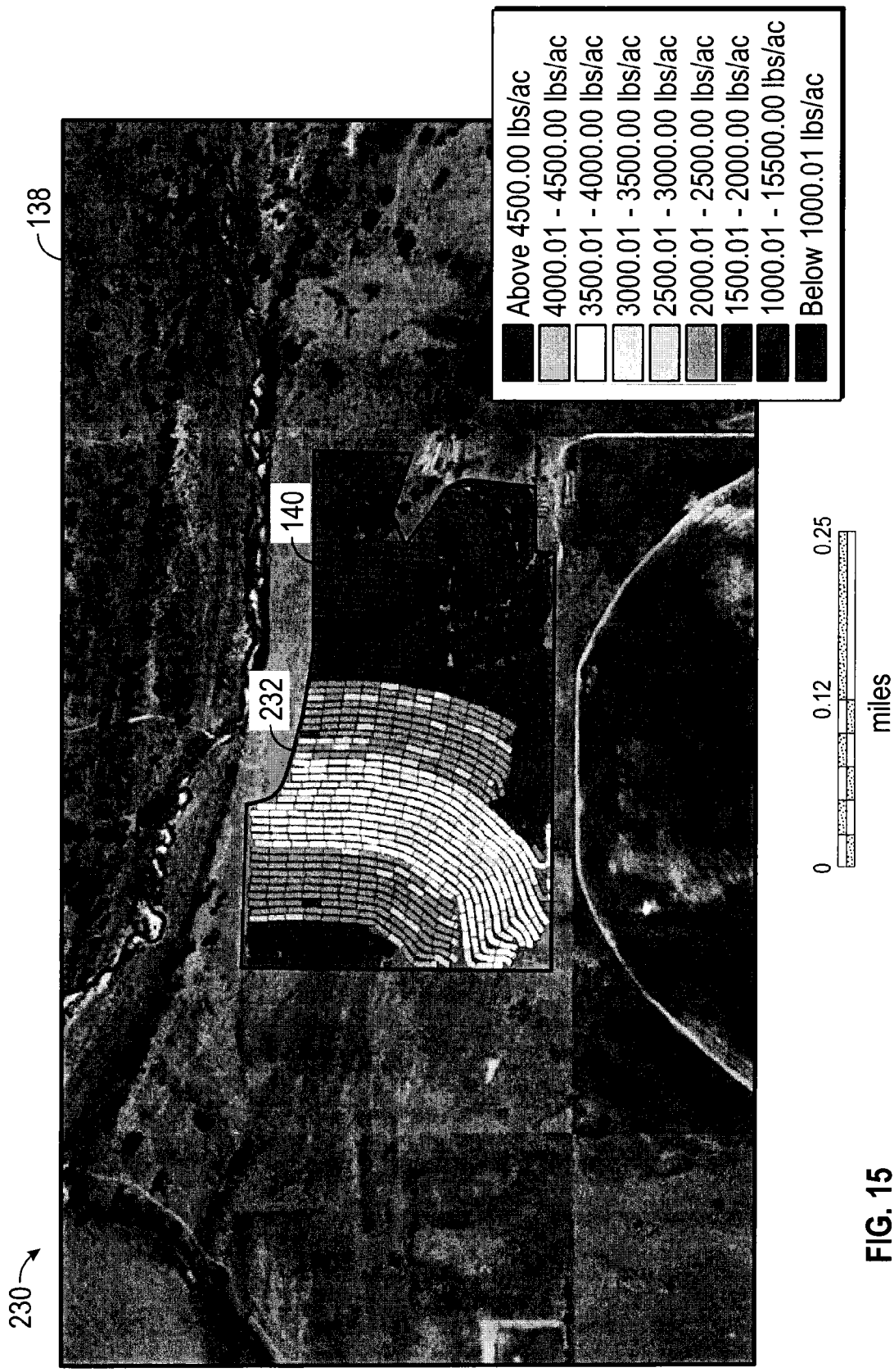
FIG. 15 is an exemplary embodiment of a log profile of applied amount of contaminant according to the inventive concepts disclosed herein.

Referring now to FIG. 14-15, in some exemplary embodiment, a log profile 230 (e.g., in real time) may be generated by the processor 200 of the applied contaminant either in volume per area (e.g., gallons per acre) equivalent or in contaminant weight-per area (e.g., pounds per acre) equivalent, or both in volume per area (e.g., gallons per acre) equivalent and in contaminant weight-per area (e.g., pounds per acre) equivalent. In some exemplary embodiments, the log profile 230 may be generated by the applicator unit 106 and/or by the control center 102 as a map with one or more overlaid GIS layers of data indicative of the volume of waste stream fluids (e.g., gallons per acre as shown FIG. 14) and/or weight of contaminant per area (e.g., pounds per acre as shown in FIG. 15) applied to the portion of the land area 138 in the perimeter 140 with each or one or more of a plurality of application passes 232. The log profile 230 may be provided in any desired format as will be appreciated by person of ordinary skill in the art. The log profile 230 may be stored by the control center 104, and may be provided to a landowner or any governing agency or body as part of a compliance program. Further, storing the log profile 230 establishes a robust quality-control and audit trail for the waste stream management system 100 according to the inventive concepts disclosed herein, and allows for subsequent applications of waste stream fluids over the same land area 138 where a contaminant capacity remains in the land area 138.

In some exemplary embodiments, the information and/or data form the log profile 230 may be used by the control center 104 to update the contaminant capacity profile 170 for a particular land area 138 and/or to determine if any contaminant capacity remains for the portion of the land area 138 in the perimeter 140 for potential subsequent applications of contaminant, which may be carried out at any time, including a predetermined contaminant breakdown or dissipation period, as will be appreciated by persons of ordinary skill in the art having the benefit of the instant disclosure.

In some exemplary embodiments, applicator units 106 according to the inventive concepts disclosed herein may include an auto steering mechanism or system (not shown) configured to automatically or substantially automatically steer the applicator unit 106, and operably coupled with the controller 184. The auto steering mechanisms or system may include one or more actuators (e.g., hydraulic, pneumatic, etc.) operably coupled with the steering system of the applicator unit 106 and configured to steer the applicator unit 106 in response to one or more control signals provided by the controller 184. The auto steering mechanisms or systems may also include one or more sensors coupled with the steering system of the applicator unit 106 and configured to detect the current position of the steering system, for example. For example, information indicative of the current position of the steering system, and/or the information used by the controller 184 to implement the steering assist indicator 221 may be utilized to operate the auto steering system to keep the applicator unit 106 on a desired travel path. A driver or operator of the applicator unit 106 may be allowed to override the auto steering system by providing steering input and/or by operating a switch, for example. Further, in some embodiments, the auto steering system may allow the applicator unit 106 to be fully or at least partially autonomous, as will be appreciated by persons of ordinary skill in the art having the benefit of the instant disclosure.

Further, in some exemplary embodiments, applicator units 106 according to the inventive concepts disclosed herein may include one or more onboard soil analyzers (not shown), which may be mounted to another portion of the applicator unit 106, such as the movable container 180. For example, the soil analyzer may be positioned upstream of the diffuser 198 and/or the variable flowrate valve 188 (e.g., substantially at the front of the applicator unit 106), and may be operably coupled with the controller 184 and configured to analyze the level of one or more contaminants in the land area 138 substantially in real time. Suitable soil analyzers may include spectrographic soil analyzers (e.g., microwave, terahertz, infrared, near infrared, visible and ultraviolet, x-ray, gamma, and/or acoustic or acoustic resonance spectrographic analyzers) or any other analyzers configured to determine soil spectra, electrical conductivity, and/or chemical compositions (e.g., TDS, chloride levels, pH, sodium levels), desirably substantially in real-time. Soil analyzers of the applicator unit 106 may also estimate or determine biomass in the land area 138, such as by determining NDVI, for example. Further, soil analyzers may measure the electrical conductivity of the soil, such as by injecting a known current in the soil via one or more electrodes, and measuring the drop in the current as it travels through the soil. In some exemplary embodiments, an X-ray fluorescence analyzer may be implemented to determine the chemical composition of the soil, as will be appreciated by persons of ordinary skill in the art having the benefit of the instant disclosure.

The controller 184 may adjust the application rate substantially in real time based on data or information provided to the controller 184 by the one or more soil analyzers. In some instances where an applicator unit 106 is provided with a soil analyzer according to the inventive concepts disclosed herein, the applicator unit 106 may be configured to operate as a close-loop system, and may or may not utilize data provided from a scouting unit 102 and/or a control center 104 according to the inventive concepts disclosed herein. For example, the controller 184 may access data from the memory 202 indicative of the maximum allowable amount or level of at least one contaminant in the land area, and may control the actuator 190 to set the variable flowrate valve 188 at a predetermined position based at least partially on the maximum allowable amount or level of the at least one contaminant in the land area 138 and the level of the at least one contaminant in the land area 138 measured by the soil analyzer.

Further, as will be appreciated by persons of ordinary skill in the art, in some exemplary embodiments of the inventive concepts disclosed herein, an onboard soil analyzer as described above may be provided to the scouting unit 102, and the applicator unit 106 may apply waste stream fluids based on a contaminant capacity profile generated by the scouting unit 102 and/or by the control center 104 substantially in real time, and/or by the applicator unit 106 following the scouting unit 102 in the land area 138, and combinations thereof.

Waste stream management systems and methods according to the inventive concepts disclosed herein provide for the application of waste stream fluids to a land area, substantially free of overlap per adjacent application pass (e.g., one complete application covering the applicable land area). In some exemplary embodiment, multiple application passes may be carried out by updating the contaminant profile to account for the additional contaminant deposited by the applicator unit 106 with preexisting levels of the at least one contaminant in the soil, to generate an updated contaminant capacity profile. The original contaminant capacity profile may be deleted once the updated contaminant capacity profile is generated, and/or saved, and/or transmitted to the applicator unit(s). The updated contaminant capacity profile may supersede the original contaminant capacity profile, as will be appreciated by persons of ordinary skill in the art having the benefit of the instant disclosure.

As will be appreciated by persons of ordinary skill in the art, a set of current application rules according to the inventive concepts disclosed herein may not be a true function of speed of the applicator unit, but may represent actual calculated cutoffs derived through contaminant loading calculations based on a contaminant capacity profile, a percentage opening of the variable flowrate valve 188 (e.g., less than 10%), and a contaminant concentration in the waste fluids being applied. Due to the variable nature of the contaminant concentrations encountered within a live waste stream produced from drilling through 300+ million years old sediment, speed functions alone have been found to be generally inadequate to ensure optimal waste stream management for live waste streams. While speed may be a function within loading calculations according to the inventive concepts disclosing herein, an optimal governing parameter may be the contaminant capacity of the land area.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished within the scope of the inventive concepts disclosed and as defined in the appended claims.

What is claimed is:

1. A contaminant management system, comprising:
   a scouting unit including a signal receiver configured to receive at least one signal indicative of a geospatial location of the scouting unit relative to a land area, at least one processor, and a non-transitory computer readable medium storing processor executable code, which when executed by the at least one processor, causes the at least one processor to map one or more georeferenced points indicative of a perimeter including a portion of the land area where a volume of fluids including a concentration of at least one contaminant is to be applied, and to transmit a first signal over a computer network indicative of the one or more georeferenced points indicative of the perimeter;
   a control center including at least one first processor and a first non-transitory computer readable medium storing first processor executable code, which when executed by the at least one first processor, causes the at least one first processor to:
   receive the first signal via a computer port coupled with the computer network;
   access data indicative of a contaminant profile of the at least one contaminant in the portion of the land area in the perimeter;
   access data indicative of a maximum allowable amount of the at least one contaminant in the portion of the land area in the perimeter;
   generate a contaminant capacity profile for the portion of the land area in the perimeter based at least in part on the contaminant profile of the at least one contaminant in the portion of the land area in the perimeter and the maximum allowable amount of the at least one contaminant in the portion of the land area in the perimeter;
   an applicator unit including:
   a movable container;
   a valve assembly including a variable flowrate valve and an actuator operably coupled with the variable flowrate valve and configured to incrementally open, close, or maintain a position of the variable flowrate valve;

a controller operably coupled with the actuator and including a location signal receiver configured to receive at least one signal indicative of a geospatial location of the applicator unit relative to the land area, at least one second processor, and a second non-transitory computer readable medium coupled with the at least one second processor and storing second processor executable code which when executed by the at least one second processor, causes the at least one second processor to access the contaminant capacity profile, access data indicative of a concentration of the at least one contaminant in a volume of fluids loaded in the movable container; and provide a control signal to the actuator to cause the actuator to incrementally open, close, or maintain the position of the variable flowrate valve based at least partially on the geospatial location of the applicator unit relative to the land area.

2. The system of claim 1, wherein the contaminant capacity profile includes at least one exclusion zone where no waste stream fluids are to be applied, and wherein the controller causes the actuator to close the variable flowrate valve in response to the movable container being in the at least one exclusion zone.

3. The system of claim 1, wherein the valve assembly further comprises:
a flowmeter operably coupled with a conduit upstream of the variable flowrate valve, the flowmeter operably coupled with the controller and configured to detect a volume of waste stream fluids flowing through the flowmeter, and to output a second signal indicative of the volume of waste stream fluids flowing through the flowmeter; and
wherein the second processor executable code further causes the at least one second processor to receive the second signal and to update the contaminant capacity profile of the land area based on the volume of waste stream fluids applied to the land area.

4. The system of claim 3, wherein the conduit includes a substantially straight portion positioned upstream of the flowmeter and configured so that fluids flowing through the substantially straight portion of the conduit enter the flowmeter in a substantially laminar fashion.

5. The system of claim 4, wherein the flowmeter is a magnetically induced flowmeter.

6. The system of claim 1, wherein the valve assembly further comprises:
a flowmeter operably coupled with a conduit upstream of the variable flowrate valve, and operably coupled with the controller, the flowmeter configured to detect a volume of waste stream fluids flowing through the flowmeter, and to output a second signal indicative of the volume of waste stream fluids flowing through the flowmeter;
a first control module operably coupled with the flowmeter, the actuator, and the controller, and configured to receive the second signal, quantify the volume of fluids flowing through the flowmeter, and transmit a third signal indicative of the volume of waste stream fluids flowing through the flowmeter to the controller;
a second control module operably coupled with the flowmeter, the actuator, and the controller, and configured to receive the second signal, quantify an amount of the at least one contaminant flowing through the flowmeter, and transmit a fourth signal indicative of the amount of the at least one contaminant flowing through the flowmeter to the controller; and
wherein the second processor executable code further causes the at least one second processor to receive the third and fourth signals and to update the contaminant capacity profile of the land area based on the volume of waste stream fluids applied to the land area and the amount of the at least one contaminant applied to the land area.

7. The system of claim 6, wherein the amount of the at least one contaminant applied to the land area is expressed as weight of the at least one contaminant per area.

8. The system of claim 6, wherein the at least one second processor transmits the control signal to the actuator by:
transmitting a volume control signal to the first control module indicative of a total volume of waste stream fluids to be applied to the land area;
transmitting a contaminant amount control signal to the second control module indicative of a total amount of the at least one contaminant to be applied to the land area; and
wherein the first control module transmits a first control signal to the actuator and the second control module transmits a second control signal to the actuator directing the actuator to incrementally open or close, or maintain a current position of the variable flowrate valve.

9. The system of claim 6, wherein the controller further comprises a wireless transceiver configured to receive a wireless signal and wherein the second processor executable code further causes the at least one second processor to receive the wireless signal indicative of an amount of the at least one contaminant applied to the land area by a second applicator unit and a geospatial location of the amount of the at least one contaminant applied in the land area, and to update the contaminant capacity profile of the land area based on the amount of the at least one contaminant applied to the land area by the second applicator unit.

10. The system of claim 9, wherein the wireless signal is a first wireless signal, and wherein the second processor executable code further causes the at least one second processor to transmit a second wireless signal indicative of a total amount of the at least one contaminant applied to the land area via the wireless transceiver.

* * * * *